United States Patent [19]
Tamura et al.

[11] Patent Number: 5,913,401
[45] Date of Patent: Jun. 22, 1999

[54] MAGNETIC SCREW DEVICE, METHOD OF MANUFACTURING MAGNETIC SCREW DEVICE, AND CONVEYING DEVICE WITH MAGNETIC SCREW

[75] Inventors: Akira Tamura; Tadashi Endo; Eiji Uematsu; Daisuke Emura, all of Komaki, Japan

[73] Assignee: CKD Corporation, Japan

[21] Appl. No.: 08/703,184

[22] Filed: Aug. 26, 1996

[30] Foreign Application Priority Data

Aug. 29, 1995 [JP] Japan .................................. 7-245527
Feb. 9, 1996 [JP] Japan .................................. 8-048048

[51] Int. Cl.⁶ .................................................. B65G 35/00
[52] U.S. Cl. ............................................................ 198/619
[58] Field of Search .............................. 198/619, 690.1, 198/468.9, 468.01

[56] References Cited

U.S. PATENT DOCUMENTS 3,754,313  8/1973  McCulloch ........................ 198/619 X
4,488,477  12/1984  Miyamoto ........................... 198/619 X

FOREIGN PATENT DOCUMENTS 58-217857  12/1983  Japan ..................................... 198/619
1-126465   5/1989   Japan .
1-209222   8/1989   Japan .
8-17625    1/1996   Japan .

OTHER PUBLICATIONS

English translation of Japanese Patent Application Laid-Open Publication No. 8–17625 (27 pages).

*Primary Examiner*—James R. Bidwell
*Attorney, Agent, or Firm*—Finnegan, Henderson, Farabow, Garrett & Dunner

[57] ABSTRACT

A magnetic screw device comprising an internal (male) magnetic screw having the even number of magnetized bands spirally magnetized on an outer surface with contiguous magnetized bands having opposite polarities and an external (female) magnetic screw having the even number of magnetized bands spirally magnetized on the same outer surface with contiguous magnetized bands having opposite polarities. The internal and external magnetic screws are composed of a plurality of spiral cylindrical magnets disposed in its axis direction, the spiral cylindrical magnet being formed of short cylindrical permanent magnet materials on each outer or inner surface which is spirally magnetized. The internal magnetic screw includes a rod member to support the inner spiral cylindrical magnets.

26 Claims, 19 Drawing Sheets

MAGNETIC SCREW DEVICE, METHOD OF MANUFACTURING MAGNETIC SCREW DEVICE, AND CONVEYING DEVICE WITH MAGNETIC SCREW

BACKGROUND OF THE INVENTION

1. Field of the Invention

The present invention relates to a magnetic screw device to convert rotary motion to linear motion by combination of a male magnetic screw and a female magnetic screw each of which is spirally magnetized on the outside surface, and more particularly to a magnetic screw device with high strength, high precision and high degree of free designing, in which a male magnetic screw or a female magnetic screw is formed from cylindrical magnets which are relatively short in length and spirally magnetized, and a method of manufacturing the magnetic screw device.

Furthermore, the present invention is concerned with a magnetic screw conveying device capable of keeping the balance of magnetic force between a male and female magnetic screws to always produce stable motion by covering a male magnetic screw or a female magnetic screw with a protecting tube.

The present invention also relates to a magnetic screw conveying device capable of driving a male and female magnetic screws while holding them constantly in noncontact each other by constructing male magnetic screw of divided blocks fitted on a rod member and by supporting rotatably the rod member having the divided male magnetic screw connected on a support stand.

2. Description of Related Art

There have been proposed various types of magnetic screw devices in which a movable member spirally magnetized on the outer surface is contained in a cylindrical housing spirally magnetized on the inner surface so as to correspond to spiral magnetization on the outer surface of the movable member, so that the rotating of the movable member or the housing can cause a linear motion of the movable member.

These magnetic screw devices have some advantages in that (1) they leave an excellent safety at the time of collision of the movable member because the movable member moves while being held in noncontact with the housing and each spirally magnetized portion only falls out of step even when the movable member had a collision with the housing; (2) the movable member being held in noncontact with the housing can reduce mechanical friction, thus preventing the occurrence of abrasion of members, dust powder, loss of transmission, and noise; (3) there is less backlash; (4) it enables remarkably free designing of a stroke, and (5) a driven section can be blocked from vibration caused by a power unit. Those advantages are not present in common mechanical conveying devices.

Accordingly, various applications of the magnetic screw to many purposes have been considered; for example, a general conveying device and an automatic door utilizing the safety at the time of collision, a conveying device used in a clean room by utilizing the advantage of no occurrence of abrasion dust powder due to the construction with no contacting portion, a conveying device for a vacuum equipment by utilizing the advantage of a noncontact construction needing no lubricating oil and enabling the use under a dry condition, a conveying device equipped in office automation equipment which is quiet due to noncontact construction, and a focusing device adapted for optical apparatus by blocking vibration caused by a power unit.

Conventional magnetic screw devices having the excellent characteristics mentioned above, however, have the following problems at the same time. Due to the disadvantages, consequently, actual production applications as discussed above have not been realized to a significant extent.

As a first disadvantage, a magnetic screw using a movable member and a housing both which are spirally magnetized is expensive because magnetization in a spiral form in a magnetic body is not easy and needs a complex process. Specifically, manufacturing such a lengthy screw is difficult and costly.

It is also difficult to manufacture magnetic screws capable of withstanding large load, because magnetic flux density does not raise easily, for instance, when a movable member is formed of a cylindrical magnetic material and magnetized its outer peripheral surface. It is especially difficult to manufacture a magnetic screw with high magnetic flux density in the case of magnetizing a long magnetic material all at once. To resolve this problem, the use of a large-sized magnetizing apparatus is required. This is not practicable.

In addition, it is difficult to obtain mechanical strength required in various devices, because when a movable member and a housing each having a long length are formed by pressing and burning processes, in particular, their center portions often become thin by the pressing process, tending to cause defects such as cracks and the like in the burning process. Many ferritic materials and rare earth materials being excellent magnetic material are brittle themselves, so that a magnetic screw made of such materials can not have sufficient mechanical strength. The existence of defects in the movable member and a housing will cause an increase of magnetic resistance inside of the magnet, resulting in a reduction of magnetic flux density accordingly.

To prevent the above problems, a method of winding spirally a magnetic band on a cylindrical member has been proposed in Japanese Patent Application laid-open No. 1-126465. This method, however, has problems that the magnetic band itself has only weak magnetic force and can not provide much accuracy in position due to differences in winding.

For conventional magnetic screw conveying devices described above, protecting the surface of a magnet by painting has been used because magnetic material is generally brittle.

However, the above conventional screw conveying devices in which the surface of magnet is protected by painting and the like have the following problems.

The magnetic material being generally brittle, if foreign substances bit and catch in a clearance between a male and female magnetic screws, a part of the male and female magnetic screws is likely to chip easily. If water and oil come into the clearance, rust is produced in pinholes and other parts of the painted surface of the magnet, resulting in a deterioration in the performance of the magnet.

Chipping a part of male and female magnetic screws and rusting in pinholes cause damage to design balance of magnetic force, resulting in the irregular conveyance of the magnetic screw conveying device. Thus, the magnetic screw conveying device can not make a stabilized conveying motion.

A conventional example of magnetic screw conveying devices disclosed in Japanese Patent Application No. 1-209222 will be described in reference with FIG. 19. A shaft 151 is rotatably supported on a couple of ball bearings 152 fixedly mounted on a frame. On the outer surface of the shaft 151, magnetized bands 153 with a north pole N and a south pole S are wound alternately and arranged in a spiral form, thus forming a male magnetic screw 171. On an end of the shaft 151 supported on the ball bearings 152, a pulley 154 is fixedly attached. Between the pulley 154 and another pulley 157 of a motor 156, a belt 155 is stretched.

Slide table 158, as its sectional view is shown in FIG. 19, is constructed so as to surround the male magnetic screw 171 and a guide bar 161 for preventing the slide table 158 from rotating during the sliding. On the inner surface of a cylindrical hollow 159 of the slide table 158 are provided magnet bands 160 with a north pole N and a south pole S wound alternately and arranged in a spiral form, thus forming a female magnetic screw 172.

In the cylindrical hollow 159, the male magnetic screw 171 is disposed with a clearance space indicated by "a" in the drawing so that the magnets 153 and 160 are not contact each other.

In the magnetic screw conveying device constructed as above, the rotation of the shaft 151 driven by the motor 156 produces magnetic force between the male and female magnetic screws 171 and 172, that is, the magnet 153 wound on the shaft 151 and the magnet 160 attached on the slide table 158. At this time, as the shaft 151 rotates, the slide table 158 moves linearly along the guide bar 161. In the meantime, if the rotation of motor 156 is reversed, opposite magnetic force works between both magnets 153 and 160, enabling the slide table 158 to move back.

Actually, those magnetic screw conveying devices proposed as above have not been readily used practically. The cause is in that if the shaft 151 is formed with a long length, it will be bent (see FIG. 20), making it impossible to move the slide table 158 without contacting the male magnetic screw 171.

Magnetic screw conveying devices can be used for conveying parts in factories and shipping vegetables in markets, for example, and there it needs linear movement in a long distance.

However, the shaft 151 is bent by the weight of the shaft 151 itself or by the attracting force produced between a pole N and a pole S of the male and female magnetic screws 171 and 172 during the operation. Specifically, in the case of the female magnetic screw 172 not being formed of an entire cylinder, for example, a semi-cylinder, the attracting force partially works on the shaft 151, so that the shaft 151 will be easily bent.

Accordingly, the male and female magnetic screws 171 and 172 are actually to work without contacting each other, but the female magnetic screw 172 tends to contact the male magnetic screw 171 at the bent portion thereof. In conventional magnetic screws, the space "a" between both magnetic screws 171 and 172 is set at about 0.5 mm, for example. In the case where a semi-cylindrical female magnetic screw is used, the shaft 151 having a radius of 15 mm will be bent by the attracting force when the length becomes 500 mm, causing the contacting of both magnetic screws.

Contacting of the male and female magnetic screws 171 and 172 can not produce any effect of non-contact movement which is a characteristic of a magnetic screw conveying device using magnetic screws. Namely, when the male and female magnetic screws 171 and 172 contact each other, it is impossible to obtain various advantages of a magnetic screw conveying device, not realized in mechanical conveying devices. As mentioned above, these include it is excellent in safety at the time of collision of the movable member because the movable member moves without contacting the housing and each spirally magnetized portion only falls out of step even when the movable member had a collision with the housing; the construction having no contacted portions can reduce mechanical friction, thus preventing the occurrence of abrasion of members, abrasion dust powder, loss of transmission, and noise; less backlash; remarkable free designing of a stroke; and a driven section can be blocked from vibration caused by a power unit.

SUMMARY OF THE INVENTION

The present invention has been made in view of the above circumstances and has an object to overcome the above problems and to inexpensively realize spirally magnetized magnets with strong magnetic force and high strength thereby to inexpensively provide magnetic screws with strong magnetic force and high mechanical strength and high positional accuracy and its manufacturing method, thereby enabling wide applications of the magnetic screw devices.

Another object of the present invention is providing magnetic screw conveying devices having stable magnetic force and high resistance and high positional precision.

The third object of the present invention is to provide magnetic screw conveying devices capable of driving with the male and female magnetic screws held in constantly noncontact with each other, even if a driving shaft provided with the male magnetic screw is formed as a long one.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a magnetic screw device of this invention comprising a male magnetic screw on an outside surface of which are provided magnetized bands with north polarity N and south polarity S arranged alternately in a spiral form, a female magnetic screw on a cylindrical inside surface facing the male magnetic screw of which are provided magnetized bands with north polarity N and south polarity S arranged alternately in a spiral form, wherein the male magnetic screw comprises a rod member and a plurality of short cylindrical male magnetic screw members made of magnetic material being fitted continuously on the outer periphery of the rod member in its axis direction.

In another aspect, a magnetic screw of the present invention comprising a male magnetic screw on an outside surface of which are provided magnetized bands with north polarity N and south polarity S arranged alternately in a spiral form, a female magnetic screw on a cylindrical inside surface facing the male magnetic screw of which are provided magnetized bands with north polarity N and south polarity S arranged alternately in a spiral form, wherein the female magnetic screw comprises a jacket member and a plurality of short cylindrical female magnetic screw members made of magnetic material being fitted continuously on the inner periphery of the jacket member in its axis direction.

In the magnetic screw device having the above construction, due to magnetic force of spiral magnetized bands provided on the outside surface of each male magnetic screw disposed on the outer periphery of the rod member, the female magnetic screw makes a spiral advance along with the jacket member in response to the rotation of the rod member. Here, the male magnetic screw is composed of a plurality of short cylindrical male magnetic screw members made of magnetic material being fitted continuously on the outer periphery of the rod member in its axis direction. And the female magnetic screw is composed of a plurality of short cylindrical female magnetic screw members made of magnetic material being fitted continuously on the inner periphery of the jacket member in its axis direction. Consequently, it is possible to provide a male and a female magnetic screws with strong force and high strength at low costs, resulting in the realization of a magnetic screw device having strong magnetic force, excellent mechanical strength, and high positional precision.

Furthermore, in a method of manufacturing a magnetic screw device of the present invention, the method comprising the steps of; inserting a rod member and a male magnetic screw composed from a plurality of male magnetic screw members, each being formed of short cylindrical magnet material, continuously fitted on an outer periphery of the rod member in its axis direction into a magnetizing instrument on an inner surface of which magnetizing lead wires are spirally provided, and then applying spiral magnetization on the male magnetic screw, and repeating a process of moving the rod member by a predetermined distance in its axis direction while supporting rotatably and applying the spiral magnetization thereon.

In another aspect of the present invention, a method of manufacturing a magnetic screw device comprising the steps of; inserting a jacket member and a female magnetic screw composed from a plurality of female magnetic screw members, each being formed of short cylindrical magnet material, continuously fitted on an inner surface of the jacket member in its axis direction into a magnetizing instrument on an outer periphery of which magnetizing lead wires are spirally provided, and then applying spiral magnetization on the female magnetic material, and repeating a process of moving the jacket member by a predetermined distance in its axis direction while supporting rotatably and applying the spiral magnetization thereon.

According to the method of manufacturing a magnetic screw device of the present invention, it is possible to provide spiral magnetized bands on the outer periphery of each male magnetic screw member and the inner periphery of each female magnetic screw member respectively so as to continue between contiguous members, thus enabling to easy producing the male and female magnetic screws.

Furthermore, a magnetic screw conveying device of the present invention comprising a male magnetic screw having magnetized bands on its outer surface and a female magnetic screw having magnetized bands on its inner surface, wherein the male magnetic screw comprises a protection tube to cover the outer periphery of the male magnetic screw. The protection tube may be provided to cover an inner periphery of the female magnetic screw.

In the magnetic screw conveying device constructed as above is provided the protection tube covering the outer periphery of the male magnetic screw or the inner periphery of the female magnetic screw, so that foreign substances such as abrasion dust, even if enter into a clearance between the male and the female magnetic screws, do not directly bit or catch the male magnetic screw, causing no damage to magnetic material forming the male magnetic screw. In addition, even when water or oil enters in the clearance by accident, magnetic material forming the male magnetic screw do not directly contact such water or oil. Accordingly, this can prevent the occurrence of rust in the male magnetic screw.

And also a magnetic screw conveying device of the present invention comprising a driving shaft including a male magnetic screw having magnetized bands with north polarity N and south polarity S arranged alternately and spirally on an outside surface on an outer periphery of a rod member, and a driving member including a female magnetic screw having magnetized bands with south polarity S and north polarity N arranged alternately and spirally on an inside surface facing the male magnetic screw, magnetic force working between the male and the female magnetic screws converting rotary motion of the driving shaft into linear motion of the driving member, wherein the male magnetic screw is constructed from a plurality of separate magnetic screws, and the magnetic screw conveying device further comprises a support stand for supporting rotatably the rod member between the separate male magnetic screws.

In the above magnetic screw conveying device, with the rotation of the driving shaft provided with the male magnetic screw, the driving member is attracted by means of magnetic force working between the male magnetic screw and the female magnetic screw of the driving member, thereby moving in its axis direction. At this time, the driving shaft is constructed of a plurality of separate male magnetic screws rotatably supported on the rod members disposed between the separate male magnetic screws. Therefore the driving shaft is not bent due to attraction by magnetic force, thus preventing the contact of the male magnetic screw with the female magnetic screw, so that the driving member can slide while being constantly held in noncontact with the driving shaft.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

Detailed descriptions of preferred embodiments embodying the present invention will now be given referring to the accompanying drawings.

Figure 1:
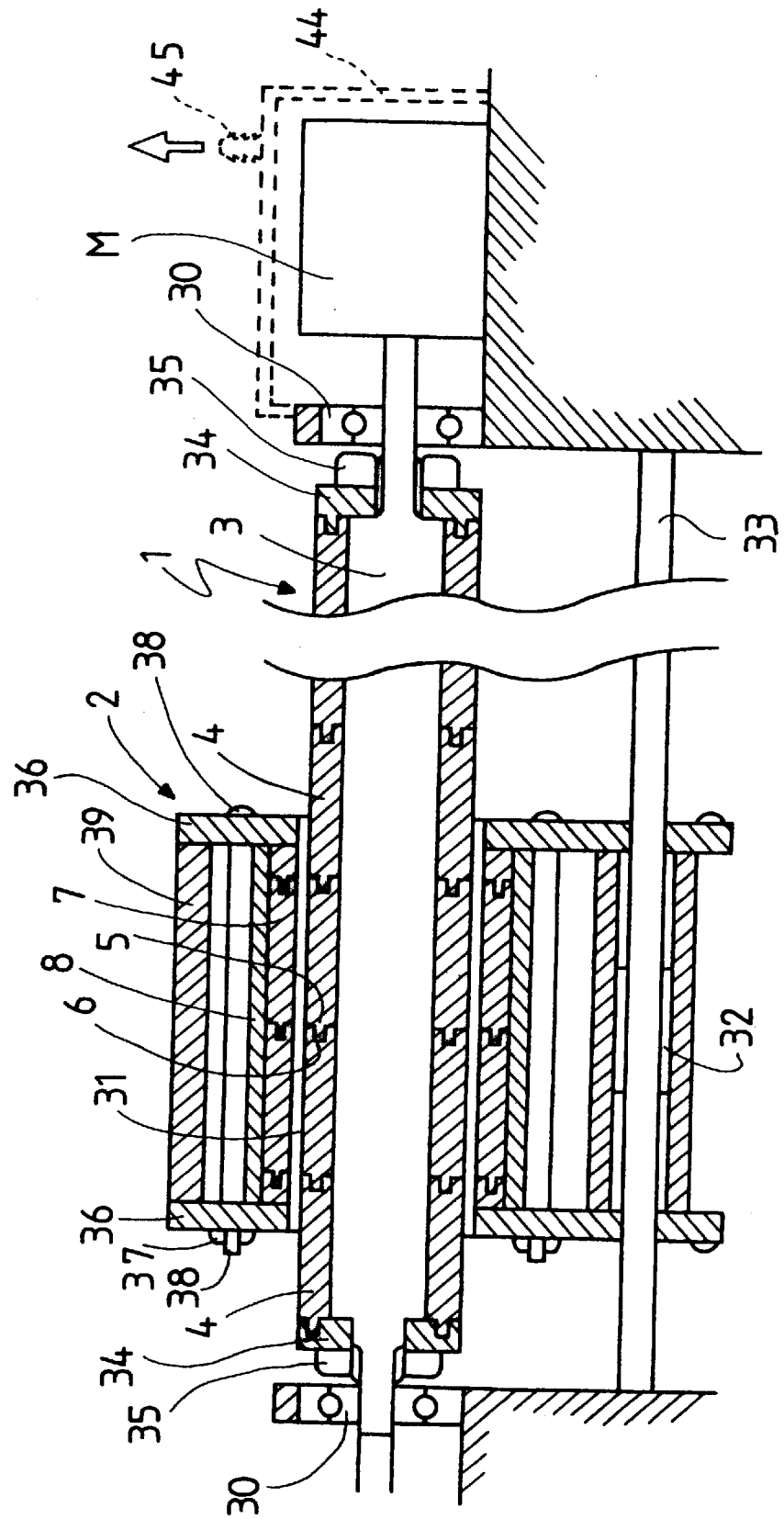
FIG. 1 is a sectional view showing the constitution of a magnetic screw device in a first embodiment according to the present invention.

At first, a magnetic screw device in a first embodiment according to the present invention will be explained in reference to FIG. 1. In FIG. 1, the magnetic screw device is mainly constructed of a shaft body 1 disposed horizontally and a housing 2 mounted on the shaft body 1 so as to be slidable in an axis direction of the shaft body 1 (in a right and left direction in the drawing). The shaft body 1 is supported on a couple of bearings 30, 30 and rotatable around its axis. In this embodiment, the shaft body 1 can be driven to rotate by a motor M disposed in a right side in the drawing. In the housing 2 is formed a cylindrical hollow 31 opening at both end surfaces of the housing 2, through which the shaft body 1 is inserted. The housing 2 is also provided with a secondary hollow 32 below the cylindrical hollow 31, in which a secondary rod 33 is inserted to prevent the rotation of the housing 2 around the shaft body 1.

The shaft body 1 will be explained in more detail. This shaft body 1 is constituted of a rod member 3 formed of a high-permeability material (e.g., iron, iron oxide, nickel, cobalt, or an alloy made of these materials as main constituents, and other compounds), and one or more spiral cylindrical magnets 4 fitted on the rod member 3. The spiral cylindrical magnets 4 are fixedly mounted on the rod member 3 with right and left end caps 34, 34 and locknuts 35, 35. At the right and left end faces of each spiral cylindrical magnet 4 are formed several positioning bosses 5 and boss holes 6. The bosses 5 of a certain spiral cylindrical magnet 4 are put into the boss holes 6 of an adjacent spiral cylindrical magnet 4, thereby making a mutual positioning. The spiral cylindrical magnet 4 is spirally magnetized on the outside surface, and its details will be explained later.

On the cylindrical hollow 31 of the housing 2 are fitted one or more spiral cylindrical magnets 7, each of which has a diameter slightly larger than that of the spiral cylindrical magnet 4 and substantially the same construction as the spiral cylindrical magnet 4. Its details will be described later as well as the spiral cylindrical magnet 4. The housing 2 also has a cylindrical jacket member 8 formed of a high-permeability material (e.g., iron, iron oxide, nickel, cobalt, or an alloy made of these materials as main constituents, and other compounds). Inside of the jacket member 8 are fitted the spiral cylindrical magnets 7. These jacket member 8 and one or more spiral cylindrical magnets 7 are fastened with right and left end caps 36, 36, locknuts 37 and clamping shafts 38. The housing 2 includes a cover 39 to form the external shape thereof.

The spiral cylindrical magnets 4 of the shaft body 1 and the spiral cylindrical magnets 7 of the housing 2 will be explained hereinafter.

Since these spiral cylindrical magnets 4 and 7 are not substantially different except their diameters, only the spiral cylindrical magnets 4 will be described herein in reference to FIG. 2. The spiral cylindrical magnet 4 is formed of a cylindrical magnet which is provided with a plurality of magnetized bands 9 spirally arranged on the outer periphery. Contiguous magnetized bands 9, 9 have opposite polarities, namely, when a certain magnetized band 9 is polarized as a north pole N on the outside surface, an adjacent magnetized band is magnetized as a south pole S on the outside surface.

Figure 3:
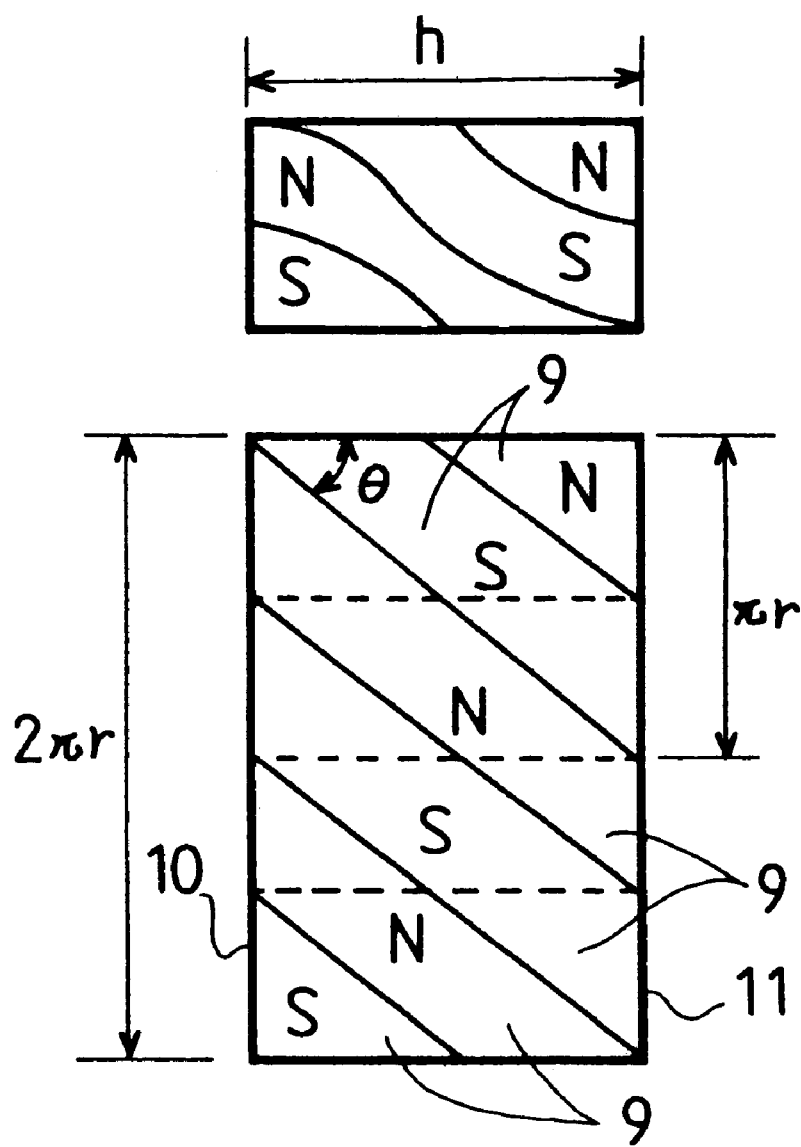
FIG. 3 is an explanatory view showing a development of the spiral cylindrical magnet.

The deflection angle of spiral magnetization on the spiral cylindrical magnet 4 is determined so that portions at an upper end 10 and a lower end 11, corresponding to each other in an axis direction, are magnetized as the same polarity. This is explained by referring to FIG. 3, specially, the lower view in FIG. 3, showing a development of the spiral cylindrical magnet 4. In the drawing, the radius of the spiral cylindrical magnet 4 is represented by "r" and the height (the horizontal length in FIG. 1) of the same by "h", not excluding the height of the positioning boss 5. In FIG. 3, if the deflection angle θ of the magnetized band 9 satisfies the following equation (1), polarities coincide at a right side and a left side in FIG. 3, so that portions of the upper end 10 and the lower end 11 corresponding in an axis direction have the same polarity, $$h \tan \theta = 2\pi r/n (n=\text{a selected natural number}) \tag{1}$$

where the denominator of the right side gives the number of magnetized bands 9 having a north pole N on the outside surface or the number of the magnetized bands 9 having a south pole S on the outside surface. FIG. 3 shows a case of n=2.

The height "h" of the spiral cylindrical magnet 4 is relatively short, specifically, within 20 mm in this embodiment. In relation to the radius "r", the height "h" is determined to be twice the value of the radius "r" or less.

The spiral cylindrical magnet 4 is provided with positioning bosses 5 at the upper end 10 and boss holes 6 at the lower end 11 so that a positioning boss 5 and a boss hole 6 are arranged respectively in a position corresponding to each other in an axis direction of the cylindrical magnet 4. The upper end 10 and lower end 11 have the same polarity at corresponding portions in an axis direction as mentioned above, enabling a long spiral cylindrical magnet by jointing the spiral cylindrical magnets 4 via the positioning bosses 5 and boss holes 6. The shaft body 1 in FIG. 1 is formed of such jointed cylindrical magnets 4 fitted on the rod member 3.

The positioning bosses 5 and boss holes 6 may be disposed with a different angle so as to give conveniences in magnetizing mentioned later. In FIG. 2, the spiral cylindrical magnet 4 has four magnetized bands 9 with a north pole N and four with a south pole S in which a magnetized band 9 is deflected by an angle of 90° around an axis between the upper end 10 and the lower end 11. Accordingly, four positioning bosses 5 and four boss holes 6 are formed on the upper end 10 and the lower end 11 respectively at every 90°. The number of the positioning bosses 5 and the boss holes 6 vary with the change of the number of magnetized bands 9.

The spiral cylindrical magnet 7 used in the housing 2 has substantially the same construction as the spiral cylindrical magnet 4. The inner surface of the spiral cylindrical magnet 7 defines the cylindrical hollow 31 of the housing 2 and, the inner radius is larger than the outer radius of the spiral cylindrical magnet 4. The difference between both radiuses produces a clearance in the cylindrical hollow between the shaft body 1 and the inner surface of the spiral cylindrical magnet 7. Accordingly, assuming the clearance to be "d", the deflection angle θ in the spiral cylindrical magnet 7 is determined so as to satisfy the following equation (2):

$$h \tan \theta' = 2\pi(r+d)/n \qquad (2)$$

wherein "n" representing the number of the magnetized bands 9 equals to that of the formula (1). This deflection angle θ' is different from the θ of the formula (1) by the clearance "d" between the inner surface of the spiral cylindrical magnet 7 and the outer surface of the spiral cylindrical magnet 4.

Consequently, the magnetic pole of the shaft body 1 and that of the housing 2 are opposite each other in the assembled magnetic screw device.

The spiral cylindrical magnet 7 is also provided with positioning bosses 5 at one end and boss holes 6 at another end as well as the spiral cylindrical magnet 4. Thus, jointing two or more cylindrical magnets 7 makes a long spiral cylindrical magnet. In the magnetic screw device shown in FIG. 1, the cylindrical magnets as constructed above are covered with a jacket member 8 to constitute the housing 2.

The spiral cylindrical magnets 4 and 7 having the above construction respectively have characteristics below.

The first one is excellent mechanical strength because it is possible to insert a strengthening member in the hollow section or to cover the surrounding section with the strengthening member. In the magnetic screw device shown in FIG. 1, a rod member 3 and a jacket member 8 are equivalent to these strengthening members. Provided mechanical strength by the use of the strengthening member, the spiral cylindrical magnets 4 and 7 can be composed of a material being excellent as magnet material but brittle, for example, ferritic materials and rare earth materials. By forming a strengthening member of a high-permeability material, it is also possible to more effectively utilize the great magnetic force of the spiral cylindrical magnets 4 and 7.

As the second characteristic, a long cylindrical magnet can be obtained. As mentioned above, the spiral cylindrical magnets 4 and 7 are constructed to have the upper end and the lower end with corresponding polarities. If two or more spiral cylindrical magnets 4 (7), accordingly, are jointed by fitting the bosses 5 of a certain magnet cylindrical 4 (7) in the boss holes 6 of an adjacent one 4 (7), the jointed spiral cylindrical magnets 4 (7), each of which being short, can produce a cylindrical magnet being long in total length. This enables the construction of a magnetic screw device having a long stroke of the housing 2. Further, by changing the number of the cylindrical magnet 4 (7), it is possible to make a cylindrical magnet having a length required according to purposes.

Next, function of the magnetic screw device in this embodiment will be described below.

In the magnetic screw device of FIG. 1, ordinarily, that is, when the shaft body 1 is not rotated, the housing 2 is at a stop due to the magnetic force between the cylindrical magnet 4 of the shaft body 1 and the cylindrical magnet 7 of the housing 2 in a position where opposed are the magnetized bands 9 of both magnets 4 and 7, having polarity attracting each other.

When the shaft body 1 is rotated by means of the motor M, the spiral cylindrical magnet 4 along with the rod member 3 rotates. With this rotating motion of the cylindrical magnet 4, its magnetized bands 9 rotate as if spirally advancing. In response to the spiral motion of the magnetized bands 9 of the cylindrical magnet 4, the spiral cylindrical magnet 7 of the housing 2 tries to move. The housing 2, being prevented from rotating around the rod member 3 by rod 33 in hole 32, will move in a right and left direction in the drawing as the magnetized bands 9 spirally moves by the rotation of the rod member 3.

In the magnetic screw device of the present embodiment, the motor M may be covered with a motor cover 44 as illustrated by a broken line in FIG. 1. This motor cover 44 has a port 45. Sucking air through the port 45 can prevent the outside dispersing of dust powder from the motor M which is an only dust powder maker. Accordingly, the magnetic screw device can be used for a clean conveying device in a clean room.

Figure 4:
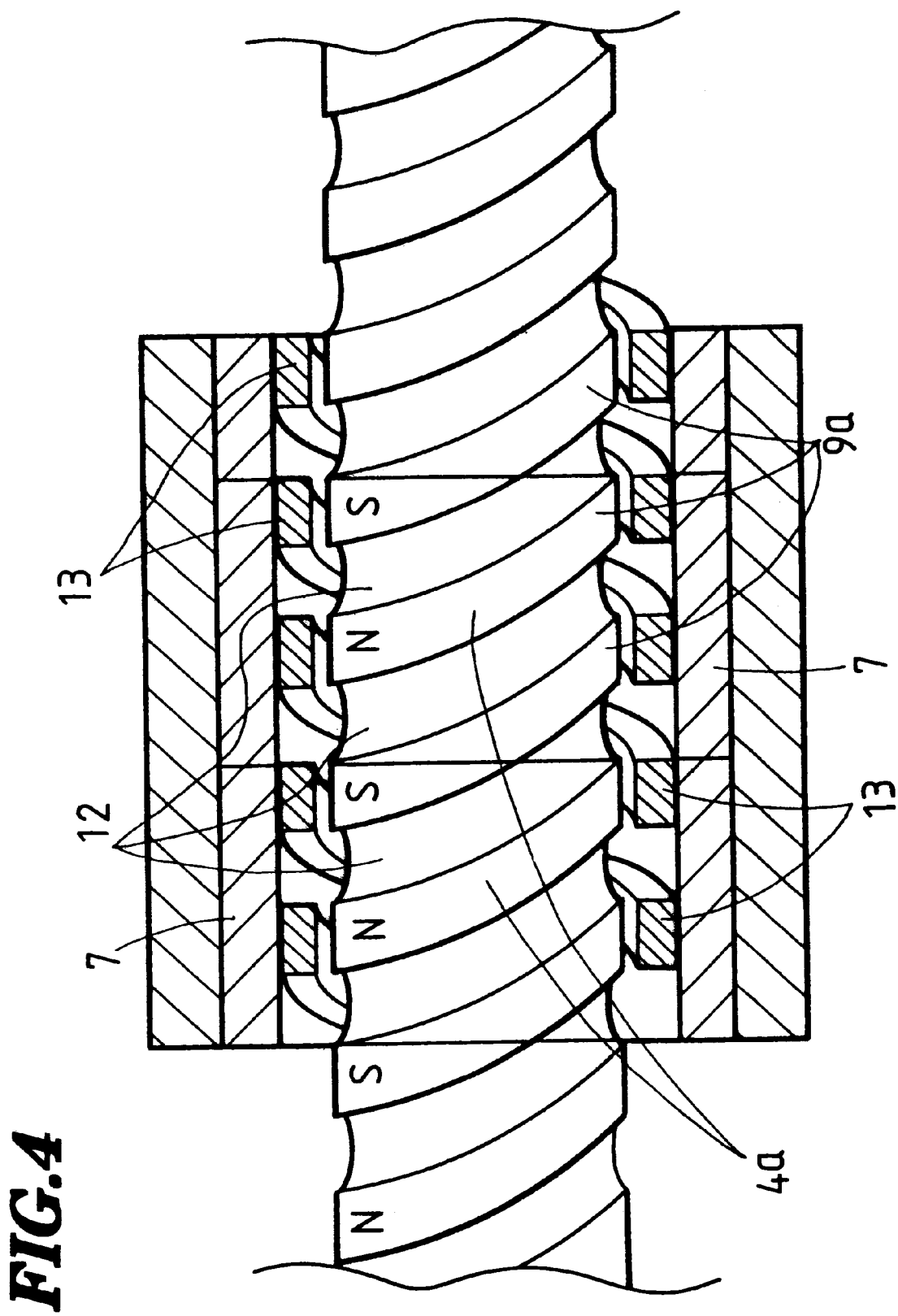
FIG. 4 is a sectional view showing a construction in a first modified example of the magnetic screw device of the first embodiment.

Next, a first modified example of a magnetic screw device in the first embodiment will be explained with reference to FIG. 4.

This modified magnetic screw device is substantially the same in construction as the above mentioned magnetic screw device. The difference point resides in the respect of the shape of a spiral cylindrical magnet 4a and that a spiral magnetic belt member 13 is fixed on the inner periphery of the spiral magnet 7 to form magnetized bands. On the outer periphery of the cylindrical magnet 4a are formed grooves 12 serving as dividing lines between the magnetized bands 9a. The spiral cylindrical magnet 4a with grooves 12 can be made by forming the grooves 12 on a cylindrical magnet material and magnetizing the cylindrical magnet material as mentioned above.

Compared with a spiral cylindrical magnet 4 having no groove, the spiral cylindrical magnet 4a with grooves 12 can concentrate magnetic flux to the magnetized bands 9a. The spiral magnetic belt member 13 fixed along the magnetized bands on the inner periphery of the spiral cylindrical magnet 7 has also the effect of concentrating magnetic flux to the spiral magnetic belt member 13. It is therefore to possible to emphasize the contrast of magnetic field and thereby increase the precision in stop position of the magnetic screw device.

A second modified example of the magnetic screw device of the first embodiment will be described in relation to FIG. 5. This magnetic screw device is substantially the same in construction as the first embodiment, except that on the inside of the spiral cylindrical magnet 4 is provided a couple of rib-shaped bosses 15 to prevent the spiral cylindrical magnet 4 from rotating around its axis direction when secured on the rod member 3. On this rod member 3, a couple of boss grooves 14 capable of engaging with the posses 15 are formed. The engagement of the bosses 15 and the boss grooves 14 makes it possible to prevent the transmission loss caused by the rotating of the spiral cylindrical magnet 4 around the rod member 3. It is also possible to form boss grooves on the inner surface of the spiral cylindrical magnet 4 and bosses on the outer surface of the rod member 3.

Figure 6:
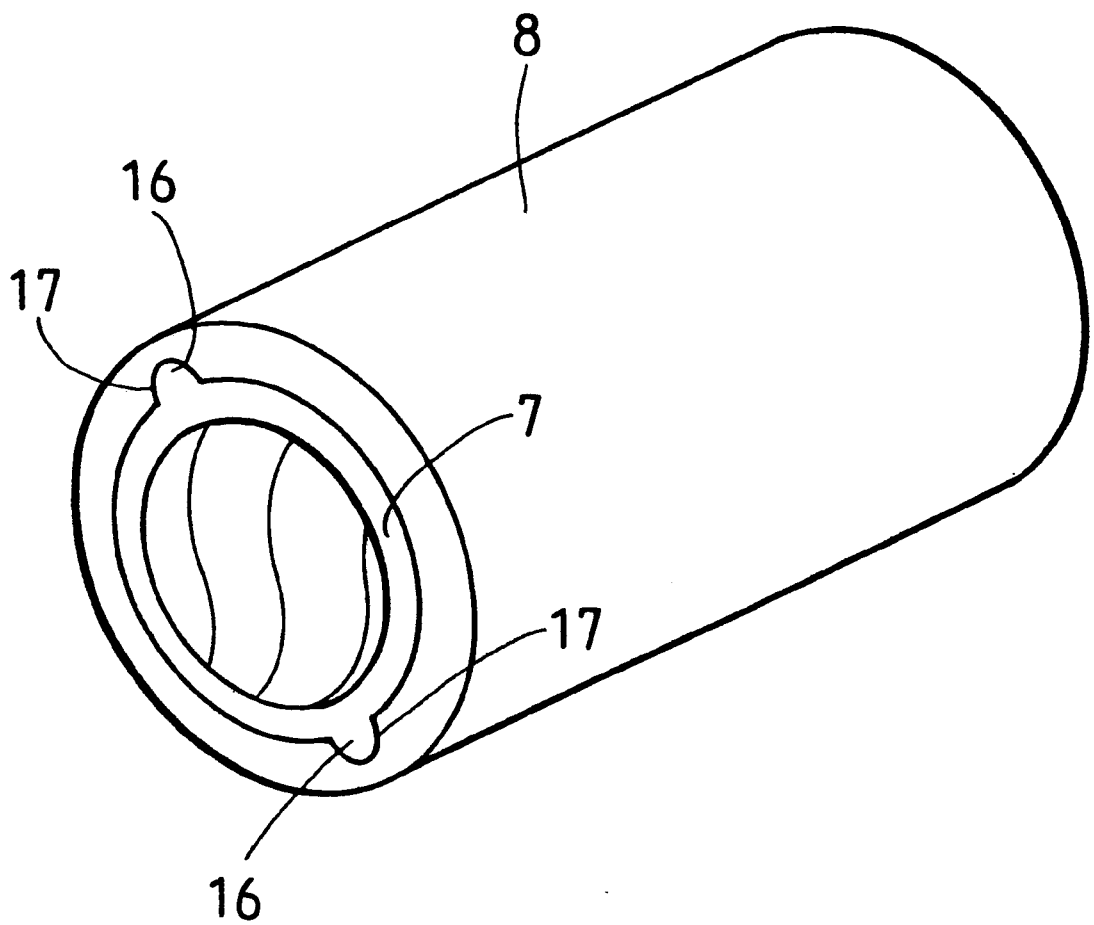
FIG. 6 is a perspective view of a housing in a third modified example of the magnetic screw device of the first embodiment.
Figure 7:
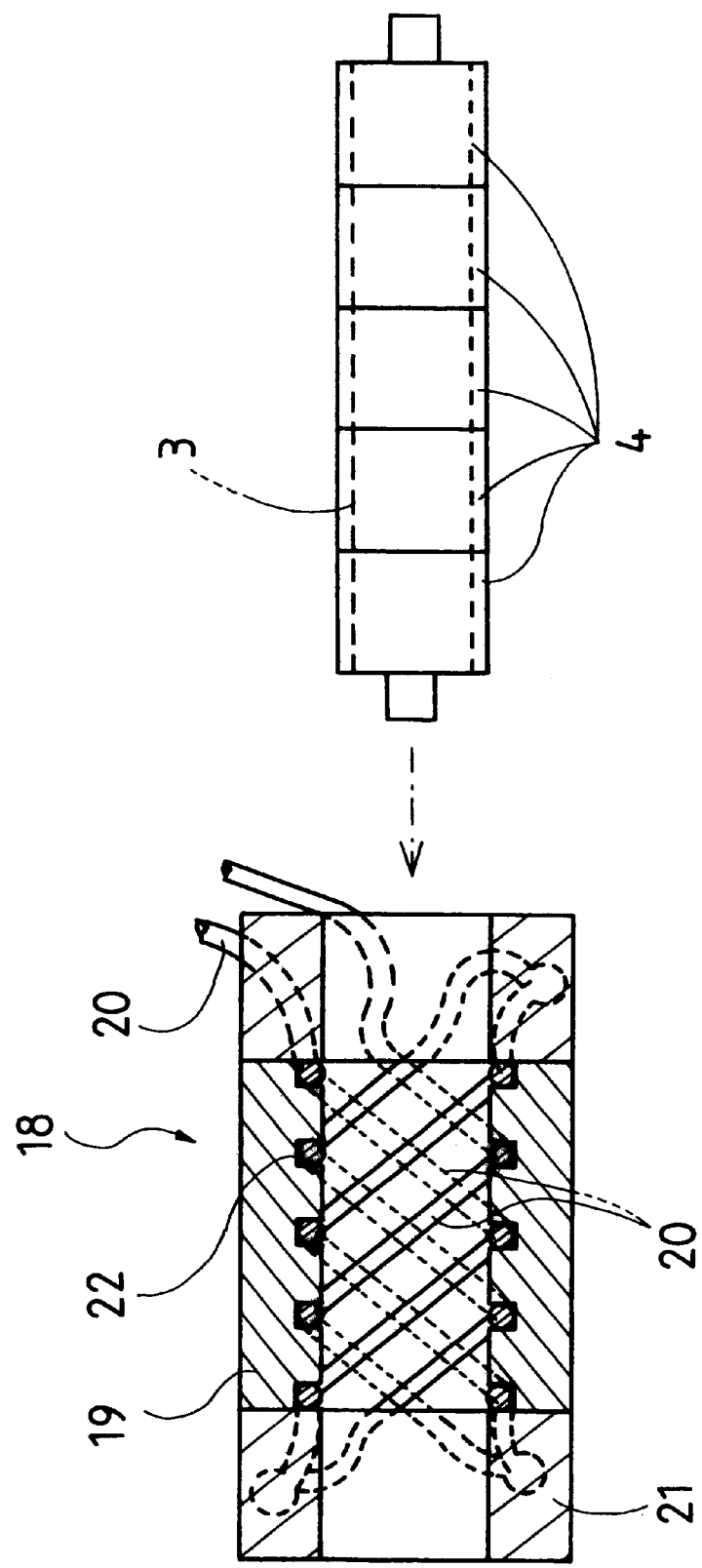
FIG. 7 is an explanatory view showing a magnetizing instrument for magnetizing an outer surface of the spiral cylindrical magnet.

A third modified example of the magnetic screw of the first embodiment will be explained in reference to FIG. 6, which has substantially the same constitution as that of the first embodiment, therefore only a difference will be explained hereinafter. The difference is in that a couple of bosses 16 of rib-shaped are formed on the outer surface of the spiral cylindrical magnet 7 to thereby prevent the rotation of the spiral cylindrical magnet 7 when inserted in the jacket member 8. This jacket member 8 is provided a couple of boss grooves 17 on the inner surface thereof. With these bosses 16 and the boss grooves 17, it is possible to prevent transmission loss caused by that the spiral cylindrical magnet 7 rotates around its axis with the respect to the jacket member 8. It is also possible to form boss grooves on the outer surface of the spiral cylindrical magnet 7 and bosses on the inner surface of the jacket member 8.

Next, the method of manufacturing the magnetic screw device in the first embodiment will be explained hereinafter. The manufacturing method of the shaft body 1 composed of the rod member 3 and the spiral cylindrical magnet 4 will be described at first.

Figure 5:
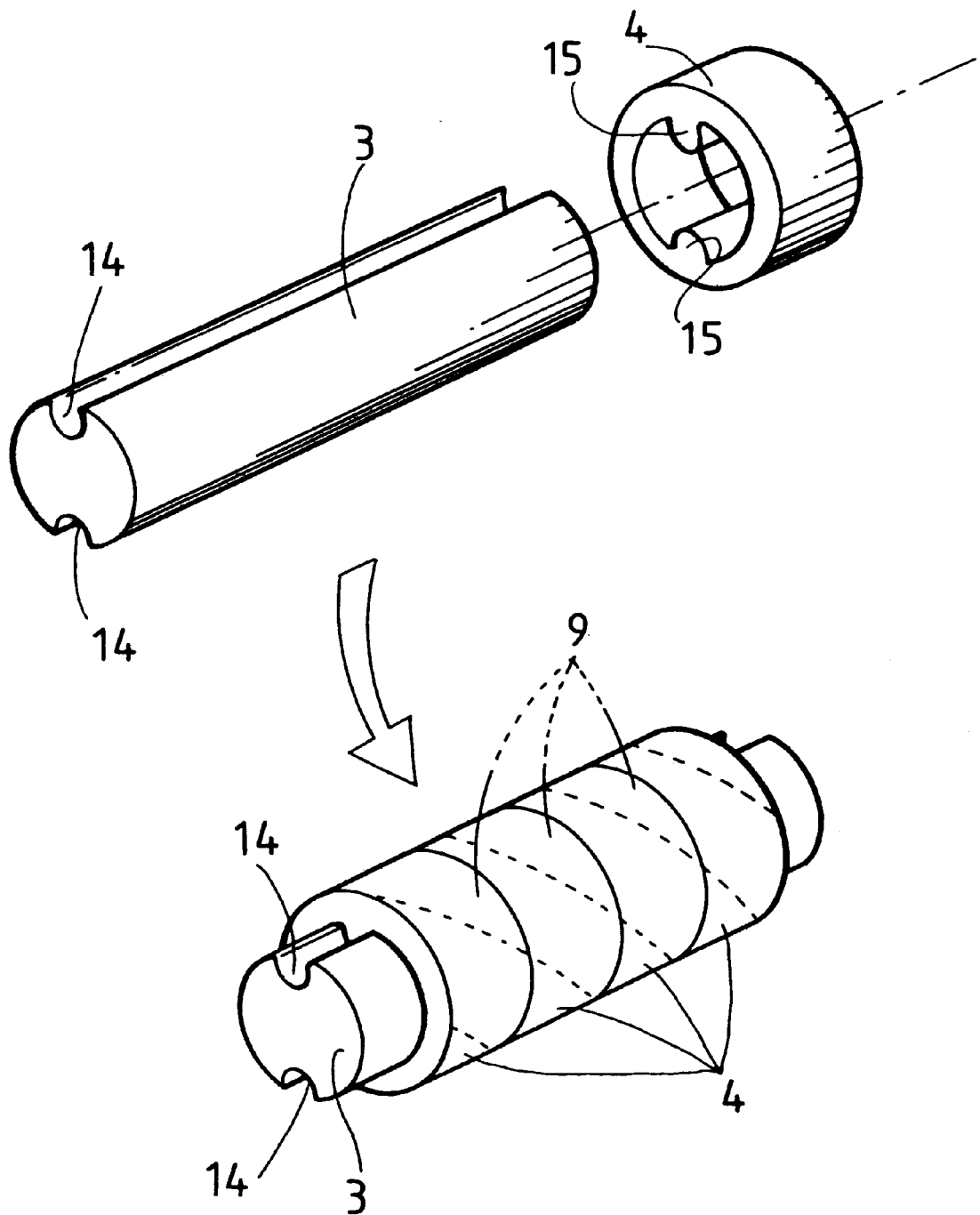
FIG. 5 is a perspective view of a shaft body in a second modified example of the magnetic screw device of the first embodiment.

When manufacturing the shaft body 1, as shown in FIG. 5, preferably, cylindrical magnets 4 which are not magnetized yet are mounted on the rod member 3 before spiral magnetization thereto. Then, spiral magnetization is conducted with a magnetizing instrument 18 shown in FIG. 17.

This magnetizing instrument 18 is constructed of a cylindrical york 19 and lead wires 20 capable of sending a large electric current, the lead wires being spirally secured on the inner surface of the york 19. This cylindrical york 19 is formed of a high-permeability material and provided with a spiral groove 22 on its inner surface to hold the lead wires 20 therein. The lead wires 20 are thus secured in position. On both ends of the york 19 are attached molds 21, 21 formed of an insulating material, in which the lead wires 20 projecting out from the both ends of the york 19 are embedded to prevent dangerous while the lead wires 20 are sending a large electric current.

The rod member 3 on which a plurality of pre-magnetized cylindrical magnets 4 are mounted is inserted in the inside of the york 19. On passing a large current of electricity (more than 10 kA in this embodiment, therefore an applied voltage of about 1.5 kV is needed ) through the lead wires 20, circumferential magnetic field is produced around the lead wires 20, thus magnetizing the magnetic material forming the spiral cylindrical magnets 4. As the lead wires 20 are spirally arranged, the cylindrical magnets are spirally magnetized. Accordingly, by repeating the magnetizing process of moving the rod member 3 by a predetermined length in its axis direction and then passing electricity through the lead wires 20, it is possible to manufacture a magnetized long shaft body 1.

In this case, the rod member 3 is rotatably held at its both ends and driven by a driving means, e.g., a step motor, while being guided by a guide member such as an LM guide. With a magneto scale and the like equipped in parallel with the LM guide, the rod member 3 is positioned to be then magnetized. When the cylindrical magnets 4 are magnetized in this way, no positioning boss 5 and boss hole 6 as shown in FIG. 2 are needed and magnetized bands of contiguous magnets 4 are naturally continuous. Even if there is a limitation in width of the york 19 where magnetization can be done, a long shaft body 1 magnetized can be obtained due to repeating of magnetization.

This magnetizing method can be carried out in spite of whether the boss 15 and the boss groove 14 are provided or not.

Figure 8:
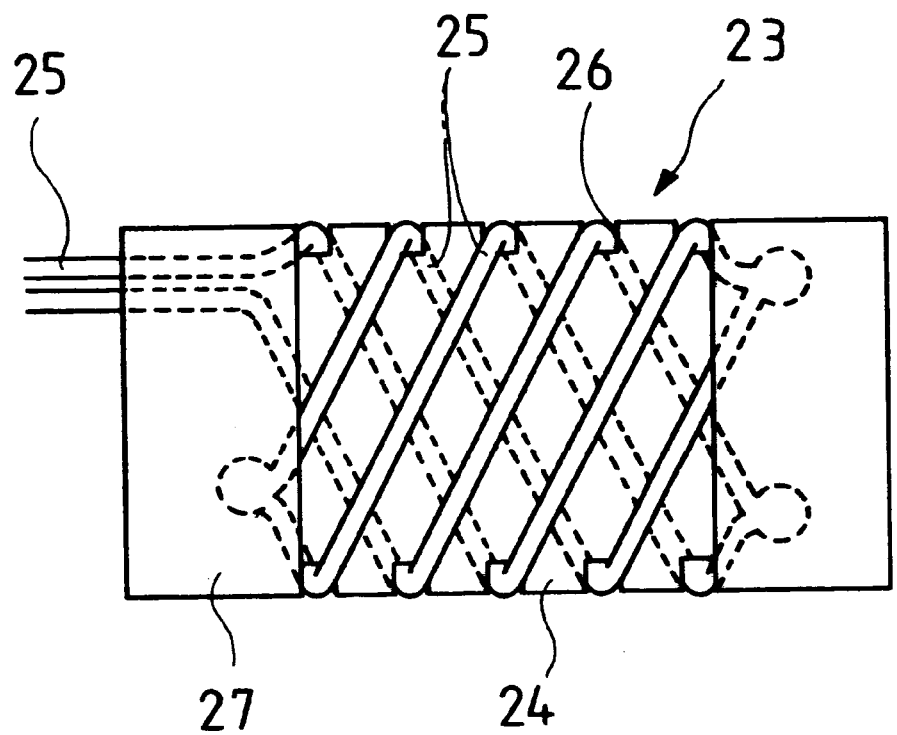
FIG. 8 is an explanatory view showing a magnetizing instrument for magnetizing an inner surface of the spiral cylindrical magnet.

In the meantime, if using a magnetizing instrument 23 shown in FIG. 8, it is possible to easily magnetize spirally the inner surface of the cylindrical magnets 7. The magnetizing instrument 23 is constructed of a cylindrical york 24 made of a high-permeability material and lead wires 25 spirally wound to the york 24 and molds 27 disposed at both ends of the york 24. On the york 24 is formed a spiral groove 26 to prevent the lead wires 25 from shifting out of position. At first, pre-magnetized cylindrical magnets 7 are inserted in the jacket member 8. The magnetizing instrument 23 is inserted in a hollow of the cylindrical magnets 7, and the current of electricity is passed through the lead wires 25, thus spirally magnetizing the cylindrical magnets 7. Repeating the process of moving the cylindrical magnets 7 and there magnetizing that part enables to manufacture a long cylindrical magnet.

Figure 2:
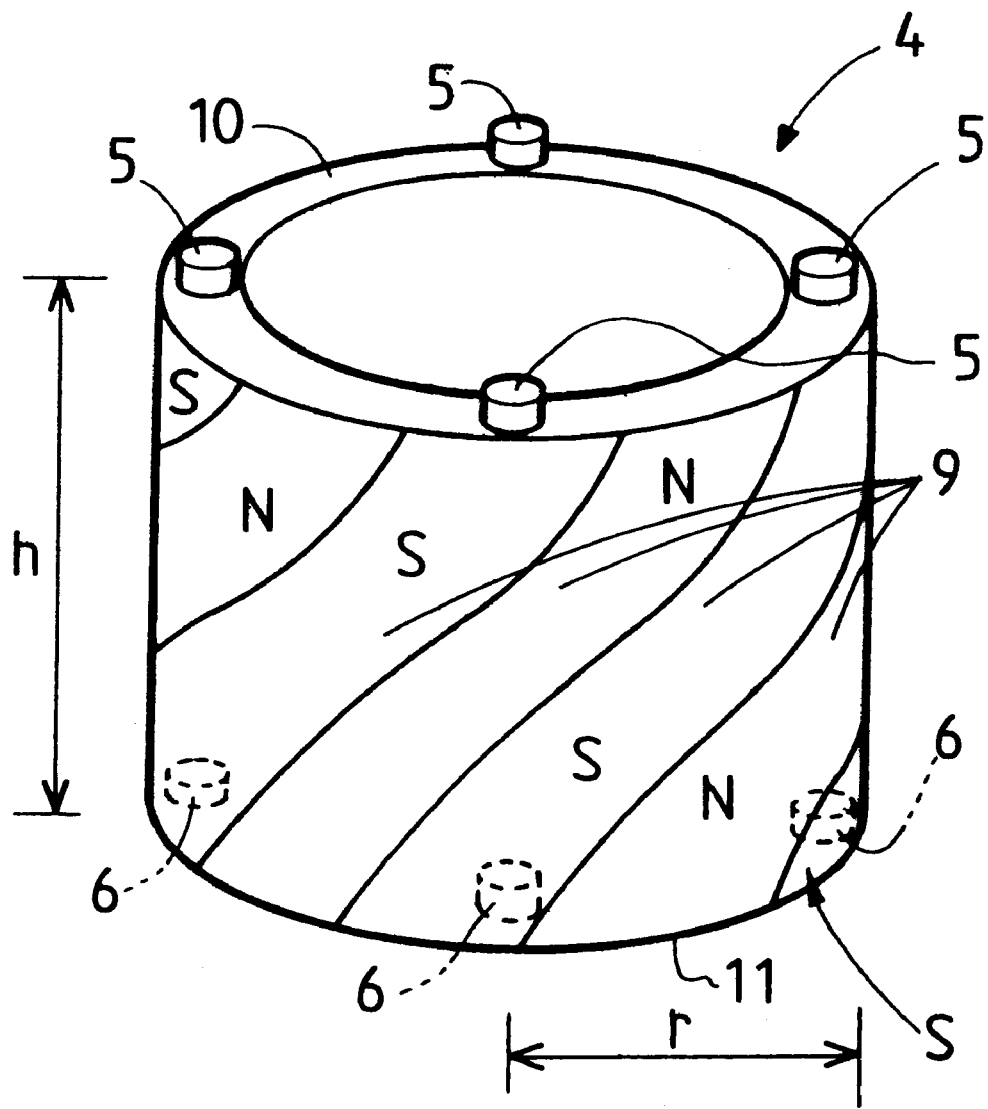
FIG. 2 is a schematically perspective view of a spiral cylindrical magnet used in the magnetic screw device of the first embodiment.

When magnetization is applied in this way, the spiral cylindrical magnet 7 needs no positioning boss 5 and boss hole 6 shown in FIG. 2, and magnetized bands of contiguous magnets 7 are naturally continuous. Even if there is a limitation in width of the york 24 where magnetization can be done, a long cylindrical magnet can be obtained by repeating the magnetizing process.

This magnetizing method can be carried out in spite of whether the boss 16 and the boss groove 17 are provided or not.

As described above, the magnetic screw device in the first embodiment, using the spiral cylindrical magnets 4 and 7 composed of cylindrical magnet materials which are spirally magnetized as screw parts, and also using a rod member 3 and a jacket member 8 both of which are composed of a high-permeability material, has a strong magnetic force and excellent mechanical strength. Furthermore, since the spiral cylindrical magnets 4 and 7 are provided with the bosses 5 and the boss holes 6, it is possible to assemble a cylindrical magnet having a desired length by using the number of the cylindrical magnets 4 and 7 according to purposes. This can increase degree of free designing in size of the housing 2 and length of the shaft body 1. With two or more positioning bosses 5 and boss holes 6, each of the spiral cylindrical magnets 4 and 7 is jointed tightly with an adjacent one. It is therefore easy to magnetize contiguous bands so as to have opposite polarities.

Being short in length, each of the spiral cylindrical magnets 4 and 7 can be easily made of even brittle magnetic material. These short cylindrical magnets can also be jointed to form a long one, which produces less defects and has a strong magnetic force.

Since the spiral cylindrical magnets 4 and 7 are mounted on the rod member 3 and the jacket member 8 respectively before magnetization and then magnetized with the magnetizing instruments 18 and 23, it is possible to easily form a long cylindrical magnet by repeating magnetization and movement. In this case, magnetized bands of contiguous spiral cylindrical magnets 4 can be continuous even if the spiral cylindrical magnet 4 has no positioning boss 5 and boss hole 6. It is the same with the spiral cylindrical magnets 7.

A magnetic screw conveying device in a second embodiment of the present invention will be explained hereinafter, referring to FIG. 9 and FIGS. 11 through 14.

Figure 13:
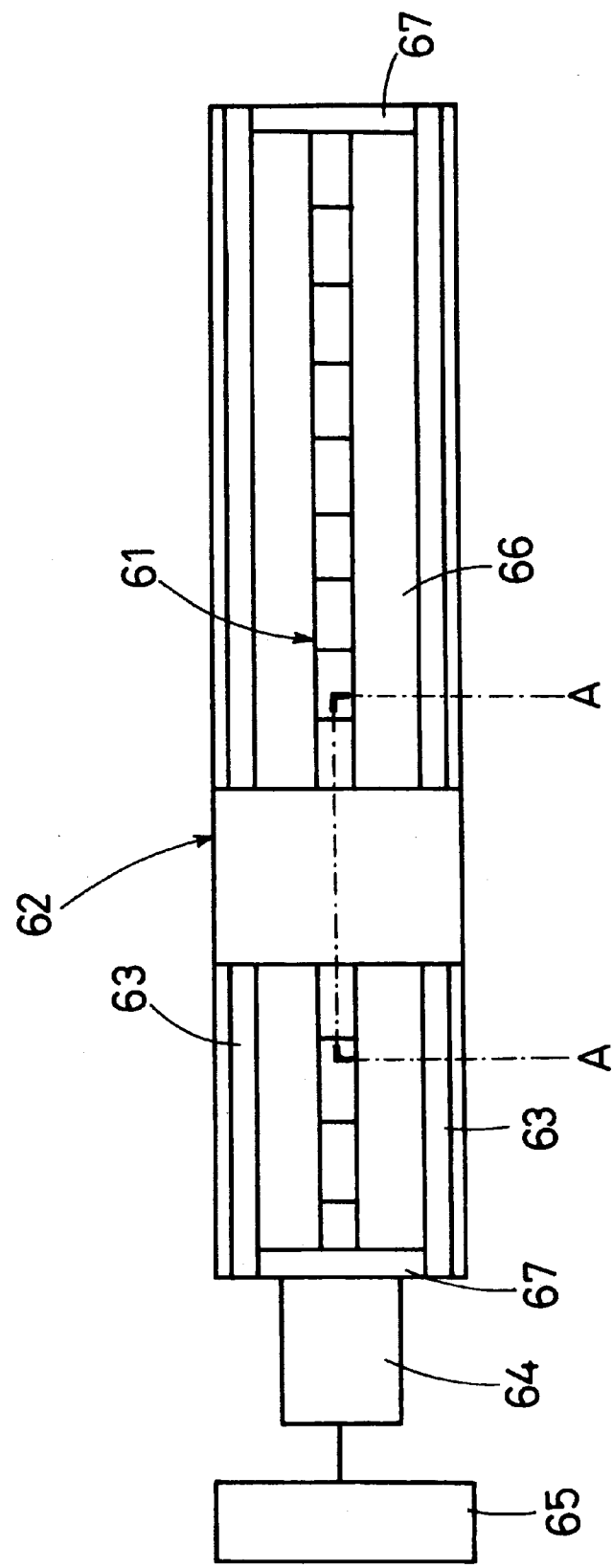
FIG. 13 is a plan view showing a whole constitution of a magnetic screw conveying device.
Figure 14:
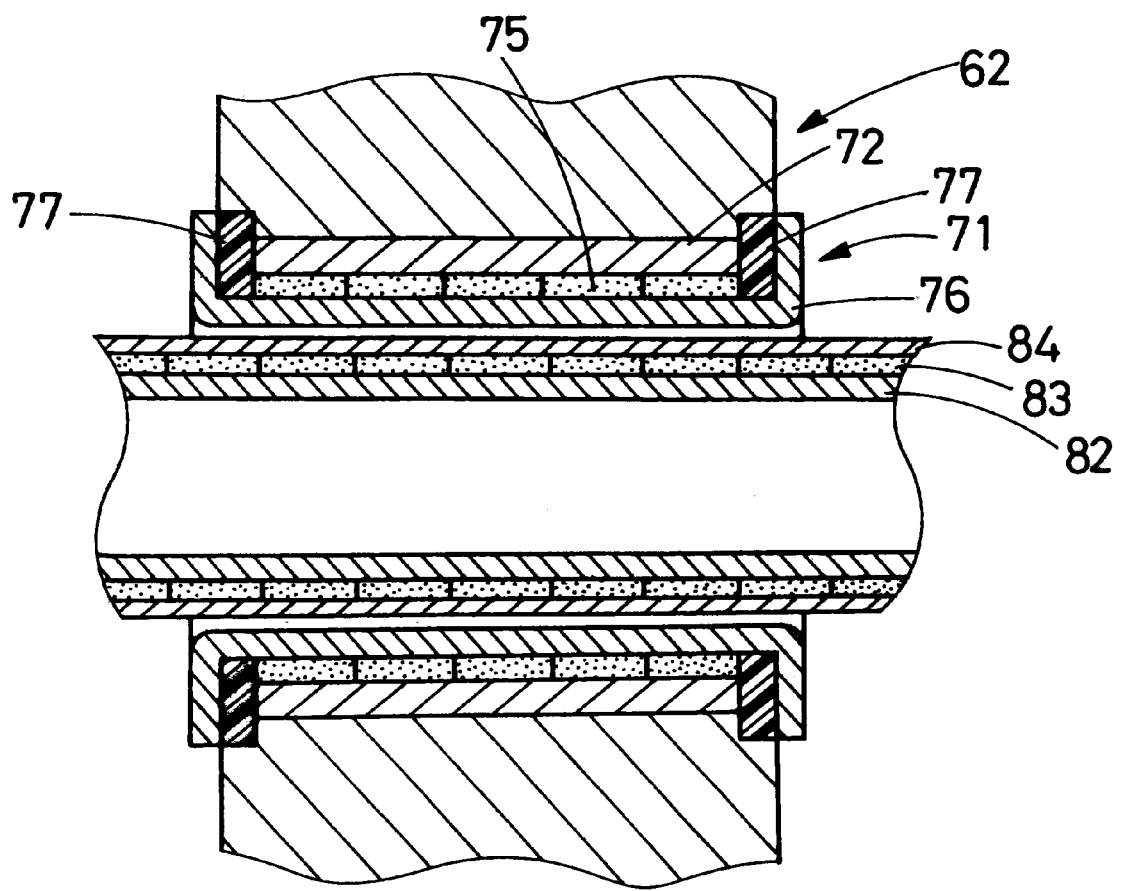
FIG. 14 is a sectional view taken along line A—A of FIG. 13.

FIG. 13 shows an entire construction of the magnetic screw conveying device in the second embodiment. FIG. 14 shows a sectional view taken along line A—A of FIG. 13.

In FIG. 13, at both ends of a base board 66, a couple of brackets 67, 67 are fixedly mounted vertically with respect to the base board 66. These brackets 67 support rotatably a male magnetic screw 61 via bearings secured in the brackets 67, the bearings being not shown in the drawing. One end of the male magnetic screw 61 is coupled with an output shaft of a step motor 64 fixedly fitted on the opposite side of the bracket 67. The step motor 64 is connected with a controller 65.

On the base board 66, a couple of guide members 63, 63 are fixed in parallel with each other along a longitudinal direction of the base board 66. To these guide members 63 is slidably attached a movable member 62. The guide members 63 is the guide along which the movable member 62 can linearly slide and also to receive the external force working on the movable member 62 in a right angle direction with a sliding direction of the movable member 62.

The male magnetic screw 61 and a female magnetic screw 71 will be explained in reference to FIG. 9, FIG. 12 and FIG. 14.

Figure 9:
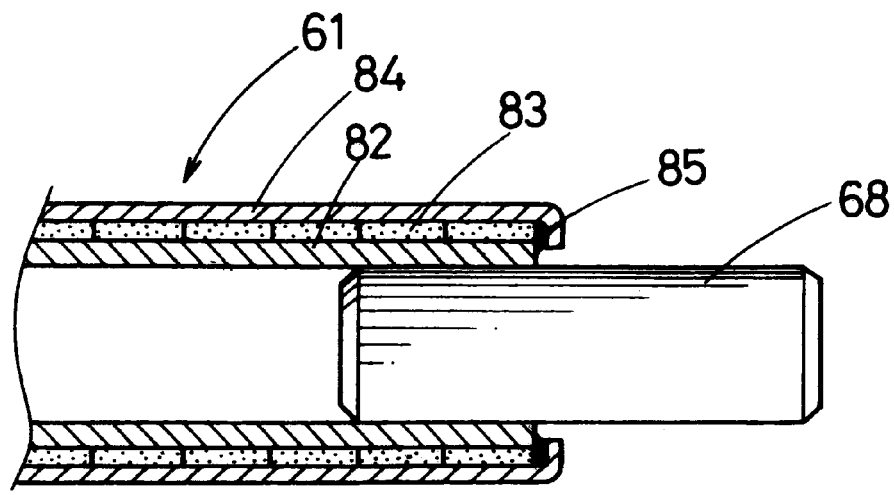
FIG. 9 is a partially sectional view showing the constitution of a male magnetic screw in a second embodiment according to the present invention.

FIG. 9 is a partial sectional view of the male magnetic screw 61 used in the magnetic screw conveying device in the present embodiment. FIG. 12 is a typical perspective view showing a relation between the male and female magnetic screws.

The male magnetic screw 61 is constructed of a hollow cylindrical core pipe 82 made of a high-permeability material (for example, iron, iron oxide, nickel, cobalt, or an alloy made of these materials as main constituents, and other compounds), a plurality of short hollow cylindrical magnets 83 fitted on the outer periphery of the core pipe 82, a couple of rod members 68 fixedly inserted in both ends of the core pipe 82, and an external stainless pipe 84 serving as a protecting tube for covering the outer periphery of the hollow cylindrical magnets 83 and being made of a feeble magnetic metallic pipe.

On each end surface of the hollow cylindrical magnets 83 disposed at both extreme ends thereof, as shown in FIG. 9, resin 85 such as urethane resin and the like is inserted to thereby fill a gap between those end surfaces and each of the end portions of the external stainless pipe 84. The external stainless pipe 84 is made of stainless steel pipe having a thickness of preferably 0.05–0.2 mm because the external stainless pipe 84 being thick will too much attenuate a magnetic force. It is also necessary to provide R (radius) to a bending portion of the external stainless pipe 84 to thereby prevent the brittle fracture thereto in a caulking process. Due to such a bending portion, there is provided a gap between the external stainless pipe 84 and the hollow cylindrical magnet 83. The resin 85 mentioned above is applied to fill the gap accordingly.

In the present embodiment, the hollow cylindrical magnet 83 in use is short in length because a long magnetic material is expensive, thus increasing the cost of manufacture, while a short hollow cylindrical magnet can remarkably reduce the cost of manufacture. The hollow cylindrical magnets 83 are firmly bonded on the outer periphery of the core pipe 82 with bonding agents, and then magnetized by a strong electro-magnet, and thus there is no problem in the performance as a male magnetic screw. Since the male magnetic screw 61 is also reinforced with the core pipe 82, there is not any problem in its strength.

Figure 12:
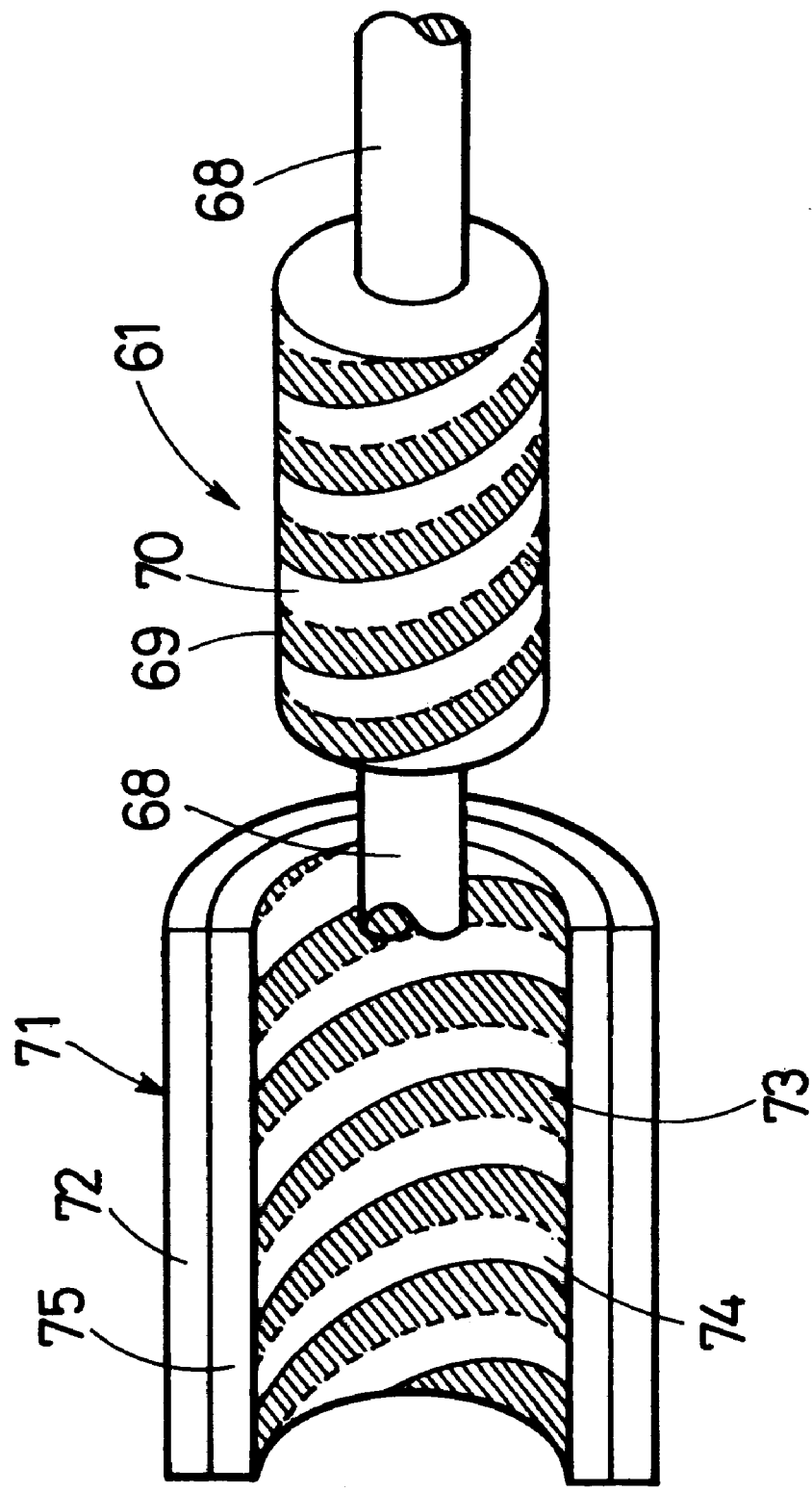
FIG. 12 is a perspective view showing a relation between a male and female magnetic screws.

On the outer periphery of the hollow cylindrical magnets 83, as shown in FIG. 12, a magnetized band 69 having a north pole N on the outside surface and a magnetized band 70 having a south pole S on the outside surface alternately arranged in a spiral form, both magnetized bands having the same width. In FIG. 12, the external stainless pipe 84 and an inner stainless pipe 76 mentioned later are omitted for visual convenience of explanation.

Next, the female magnetic screw 71 is composed of a plurality of short cylindrical magnets 75 jointed, a jacket member 72 in a hollow cylindrical form in which the short cylindrical magnets 75 are fitted, and an internal stainless pipe 76. As shown in FIG. 14, this female magnetic screw 71 is fixedly fitted in the inner hollow of the movable member 62. The cylindrical magnet 75 has substantially the same construction as the hollow cylindrical magnet 83 of the male magnetic screw 61 except having a diameter larger than that of the hollow cylindrical magnet 83. The hollow cylindrical jacket member 72 is formed of a high-permeability material (e.g., iron, iron oxide, nickel, cobalt, or an alloy made of these materials as main constituents, and other compounds).

The cylindrical magnets 75 are inserted in the inside of the jacket member 72 and bonded thereon with bonding agents. Inside of the cylindrical magnets 75, there is further provided an internal stainless pipe 76 of a feeble magnetic metallic pipe, serving as a protecting tube for covering the entire inner periphery of the cylindrical magnets 75. This internal stainless pipe 76 is fixedly fitted on the cylindrical magnets 75 by caulking both end portions of the internal stainless pipe 76, thus making the cylindrical magnets 75 tightly secured on the jacket member 72. On each end surface of the cylindrical magnets 75 disposed at both extreme ends thereof, resin 77 such as urethane resin and the like is inserted to fill a gap between those end surfaces and each of the end portions of the internal stainless pipe 76. The internal stainless pipe 76 is made of stainless steel pipe being preferably 0.05–0.2 mm in thickness because the internal stainless pipe 76 having a large thickness will too much attenuate magnetic force. It is also necessary to provide R (radius) on a bending portion of the internal stainless pipe 76 to prevent the brittle fracture thereto in a caulking process. Due to such a bending portion, there is provided a gap between the internal stainless pipe 76 and the cylindrical magnet 75. The resin 77 mentioned above is applied to stop the gap accordingly.

In the present embodiment, the cylindrical magnet 75 in use is short in length because a long magnetic material is expensive, thus increasing the cost, while a short hollow cylindrical magnet can remarkably reduce the cost of manufacture. The cylindrical magnets 75 are firmly bonded on the inner periphery of the jacket member 72 with bonding agents, and then magnetized by a strong electro-magnet, thus there is no problem in the performance of male magnetic screw. Since the female magnetic screw 71 is also reinforced with the jacket member 72, there is not any problem in its strength.

On the inner periphery of the cylindrical magnets 75, as shown in FIG. 12, a magnetized band 73 having north polarity N and a magnetized band 74 having south polarity S alternately arranged in a spiral form, both magnetized bands having the same width. These magnetized bands 73 and 74 are formed in the same direction and with the same width as the magnetized bands 69 and 70, respectively.

Being mechanically reinforced with the core pipe 82 and the jacket member 72 respectively, the hollow cylindrical magnet 83 and the cylindrical magnet 75 can be formed of a material which is excellent as magnetic material but brittle, such as ferrite or rare earth materials.

If the core pipe 82 and the jacket member 72 are made of a high-permeability material, it is possible to more effectively utilize a strong magnetic force of the hollow cylindrical magnet 83 and the cylindrical magnet 75.

Next, function of the magnetic screw conveying device in the second embodiment will be explained. In this magnetic screw conveying device shown in FIG. 13, normally, i.e., when the male magnetic screw 61 is not rotated, the hollow cylindrical magnets 83 of the male magnetic screw 61 and the cylindrical magnets 75 of the movable member 62 side constantly attract each other; the magnetized band 69 with north polarity N and the magnetized band 74 with south polarity S attract each other as well as the magnetized band 70 with a south pole S and the magnetized band 73 with a north pole N, thus making the movable member 62 be at a stop.

When the male magnetic screw 61 is rotated by the step motor 64, the hollow cylindrical magnets 83 rotates along therewith. According to this rotation of the hollow cylindrical magnets 83, the magnetized band 69 with north polarity N and the magnetized band 70 with south polarity S rotate as if spirally advancing. In response to the spiral motion, the cylindrical magnets 75 of the movable member 62 side receiving the magnetic force from the cylindrical magnets 83 try to spirally move. The movable member 62, attached on the guide members 63, is constantly prevented from rotating around the male magnetic screw 61. Accordingly, the movable member 62 slides linearly as the magnetized bands 69 and 70 spirally move by the rotation of the male magnetic screw 61. This linear sliding direction of the movable member 62 depends on the rotating direction of the male magnetic screw 61. Changing the rotating direction of the male magnetic screw 61 causes the movable member 62 to move in an opposite direction.

Here, the hollow cylindrical magnets 83 of the male magnetic screw 61 are covered by the external stainless pile 84 and the cylindrical magnets 75 are covered by the internal stainless pipe 76. Even if foreign substances such as abrasion dust enter in the clearance between the male magnetic screw 61 and the female magnetic screw 71, therefore, the hollow cylindrical magnets 83 and the cylindrical magnets 75 do not directly contact with the foreign substances. Accordingly, there is no possibility that the foreign substances damage the hollow cylindrical magnets 83 and the cylindrical magnets 75.

Similarly, even in the case where water or oil enters in the clearance, the male magnetic screw 61 and the female magnetic screw 71 do not directly contact with the water or oil, enabling to prevent the occurrence of rust on the cylindrical magnets 75 and the hollow cylindrical magnets 83.

According to the magnetic conveying device of the present embodiment, it is possible to conduct stable conveyance while maintaining a good proportion of magnetic force between the male and female magnetic screws 61 and 71.

Since the external stainless pipe 84 and the cylindrical magnets 75 are of thin pipe, they do not substantially affect the attracting force between the male and female magnetic screws 61 and 72, thus causing no problem in conveyance by the magnetic screw conveying device.

Figure 10:
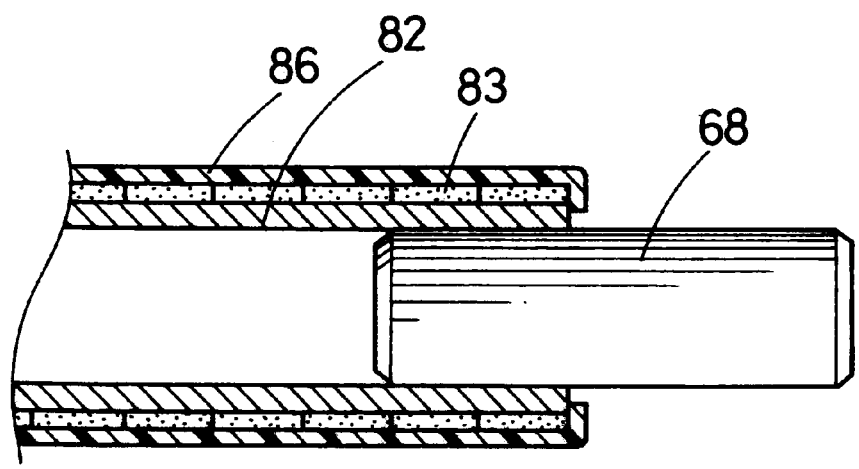
FIG. 10 is a partially sectional view showing a male magnetic screw in a modified example of the second embodiment.
Figure 11:
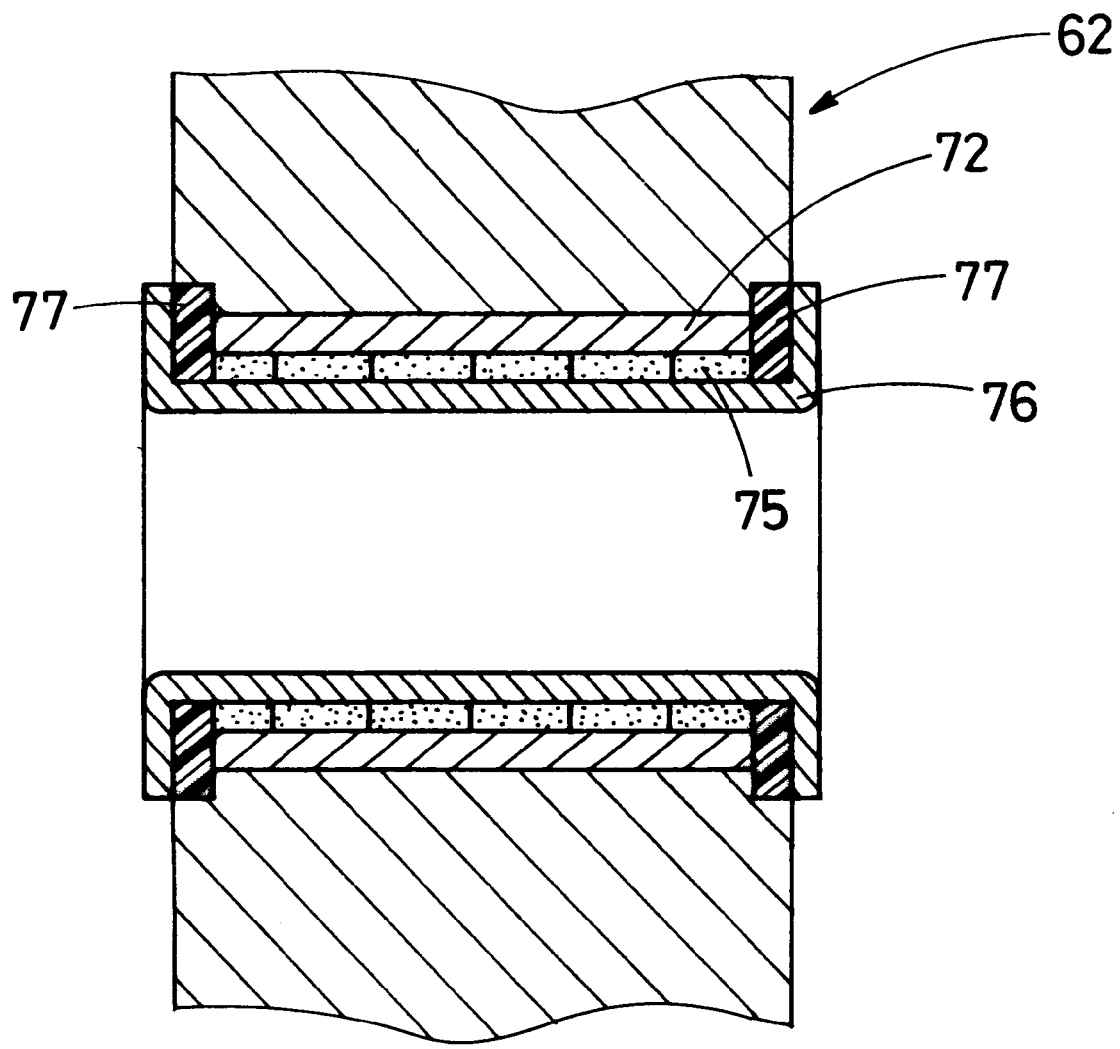
FIG. 11 is a sectional view showing a female magnetic screw.

A first modified example of the magnetic screw conveying device in the second embodiment will be continued, referring to FIG. 10. This modified magnetic screw conveying device is substantially the same in construction as the second embodiment mentioned above, the difference point is in that a thermal contractible tube 86 is used instead of the external stainless pipe 84. This thermal contractible tube 86 has a thickness of 0.05–0.2 mm. The thermal contractible tube 86 can easily be stuck to the hollow cylindrical magnets 83, and is inferior in durability to the external stainless pipe 84 but easily manufactured, thus enabling the reduction of the cost.

Figure 15:
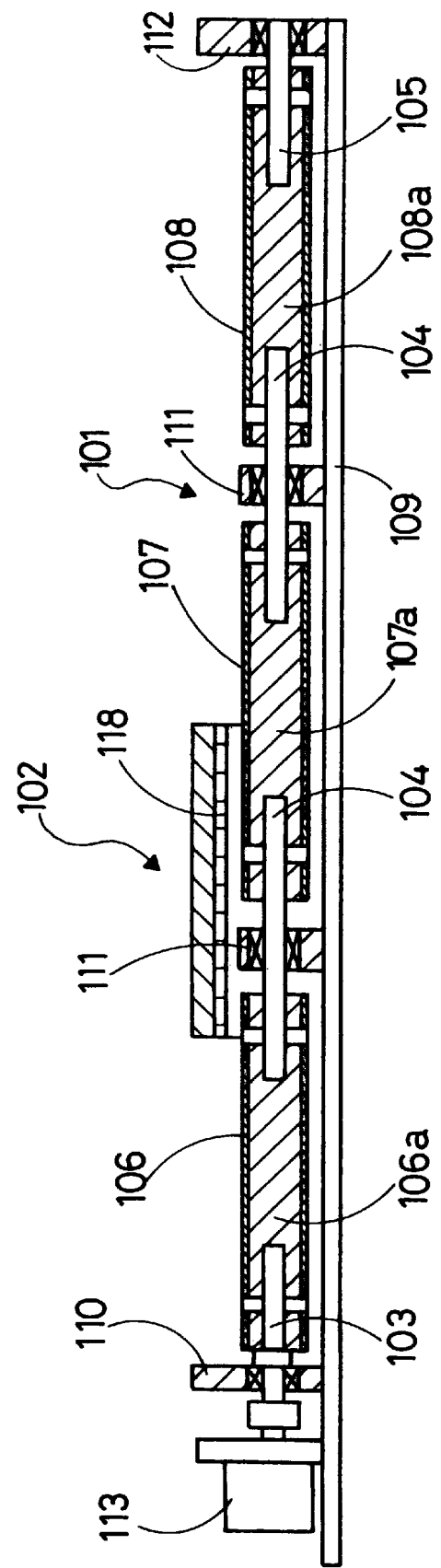
FIG. 15 is a sectional view showing a third embodiment of the magnetic screw conveying device according to the present invention.

A third embodiment of the magnetic conveying device according to the present invention will be described hereinafter with reference to FIGS. 15 through 18. FIG. 15 is a sectional view of the magnetic screw conveying device in the third embodiment.

As shown in FIG. 15, the magnetic screw conveying device is mainly composed of a driving shaft 101 disposed horizontally and a slide table 102 which is mounted on the driving shaft 101 so as to be slidable in a right and left direction in the drawing.

The driving shaft 101 is constructed of male magnetic screws 106, 107, and 108 which are jointed in order with a support shaft 103 disposed in a motor side, two middle support shaft 104, 104, and a support shaft 105 disposed at another end side.

These support shafts 103, 104, 104, and 105 are rotatably supported on end support stands 110, 112, and middle support stands 111, 111, which are set up on a base 109. On those support shafts 103, 104, 105, the male magnetic screws 106, 107, 108 are fitted rotatably and can be fixed at a predetermined position, and its detail will be mentioned later. A motor 113 for driving the driving shaft 101 to rotate is disposed so that its rotary shaft is coaxially with the motor side support shaft 103, the middle support shafts 104, and the end support shaft 105.

Figure 16:
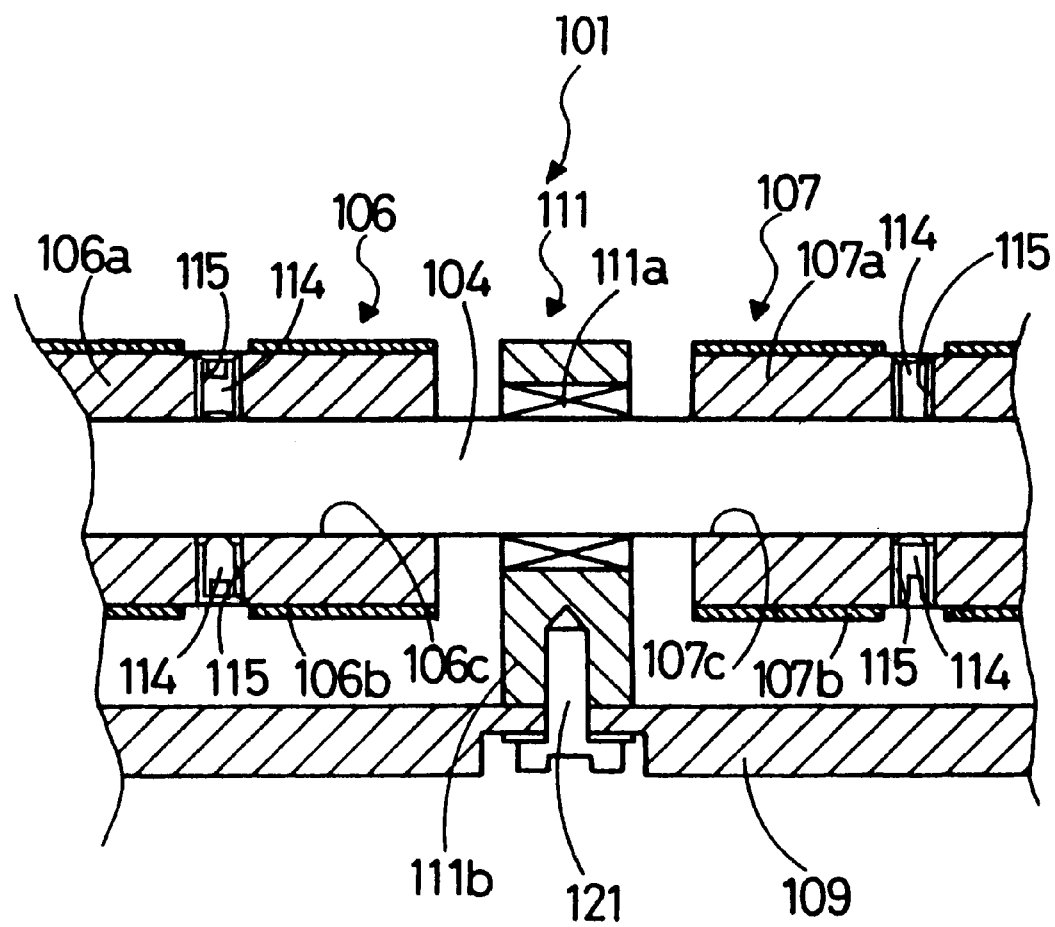
FIG. 16 is a enlarged sectional view of a driving shaft of the magnetic screw conveying device.
Figure 17:
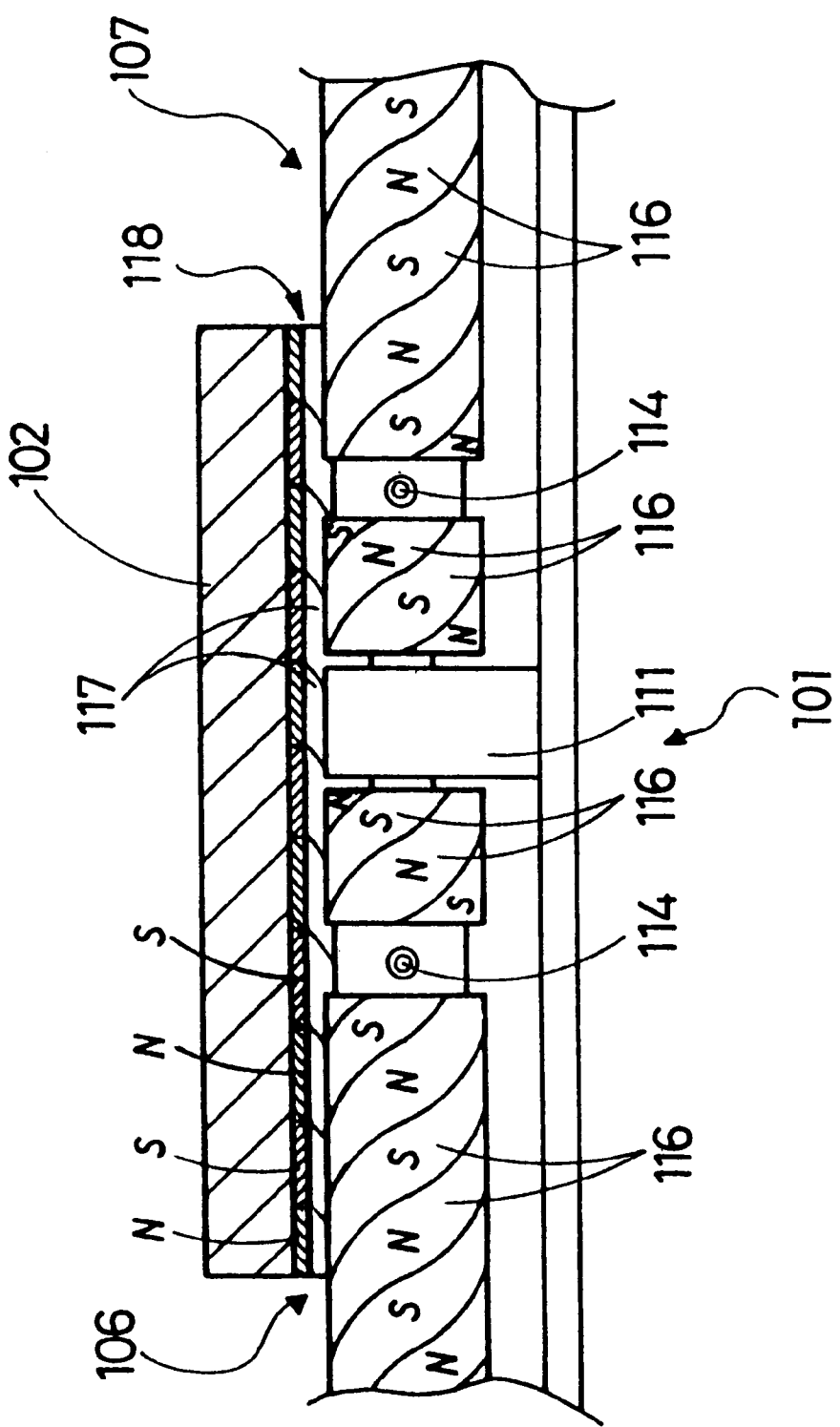
FIG. 17 is a part of a side view of the magnetic screw conveying device.

FIG. 16 is an enlarged sectional view of the male magnetic screws 106 and 107 mounted on the middle support shaft 104 supported on the middle support stand 111. FIG. 17 is a partial side view of the driving shaft 101 shown in FIG. 16. In these figures, the male magnetic screw 108 is omitted because it has the same construction as the male magnetic screws 106 and 107.

The male magnetic screws 106 and 107 are composed of rods 106a and 107a being rod core and spiral cylindrical magnets 106b and 107b covering the rods 106a and 107a respectively. These rods 106a and 107a are made of a high-permeability material (e.g., iron, iron oxide, nickel, cobalt, or an alloy made of these materials as main constituents, and other compounds). The spiral cylindrical magnets 106b and 107b are in a cylinder form and constituted of a plurality of magnetized bands 116 spirally arranged. Contiguous magnetized bands 116 have opposite polarities; that is, when a certain magnetized band 116 has north polarity N on the outside surface, an adjacent magnetized band 116 has south polarity S on the outside surface.

On the other hand, the rods 106a and 107a are provided at both end portions with cylindrical holes 106c and 107c in the axis direction of the rods 106a and 107a, in which the motor side support shaft 103 or the middle support shaft 104 are inserted, and also with screw holes 115 formed vertically to the axis of the rods 106a and 107a. These screw holes 115 are to fasten the male magnetic screws 106 and 107 to the middle support shaft 104.

The middle support stand 111, supporting the middle support shaft 104. is composed of a pedestal 111b with a ball bearing 111a to support the middle support shaft 104, which is vertically installed on the base 105 with a screw 121.

Figure 18:
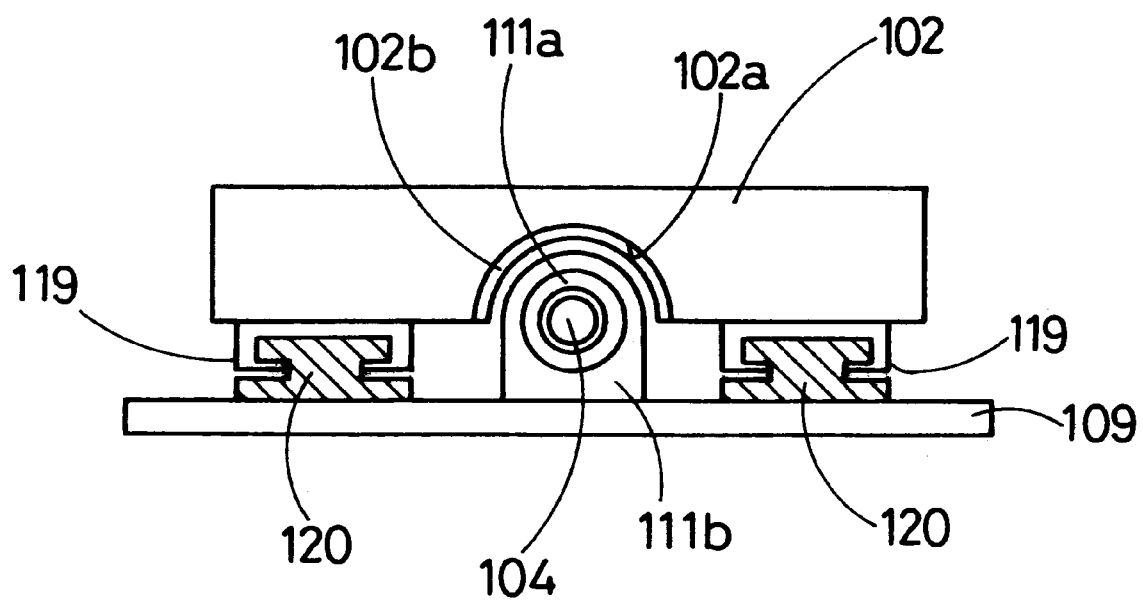
FIG. 18 is a front view of the magnetic screw conveying device.
Figure 19:
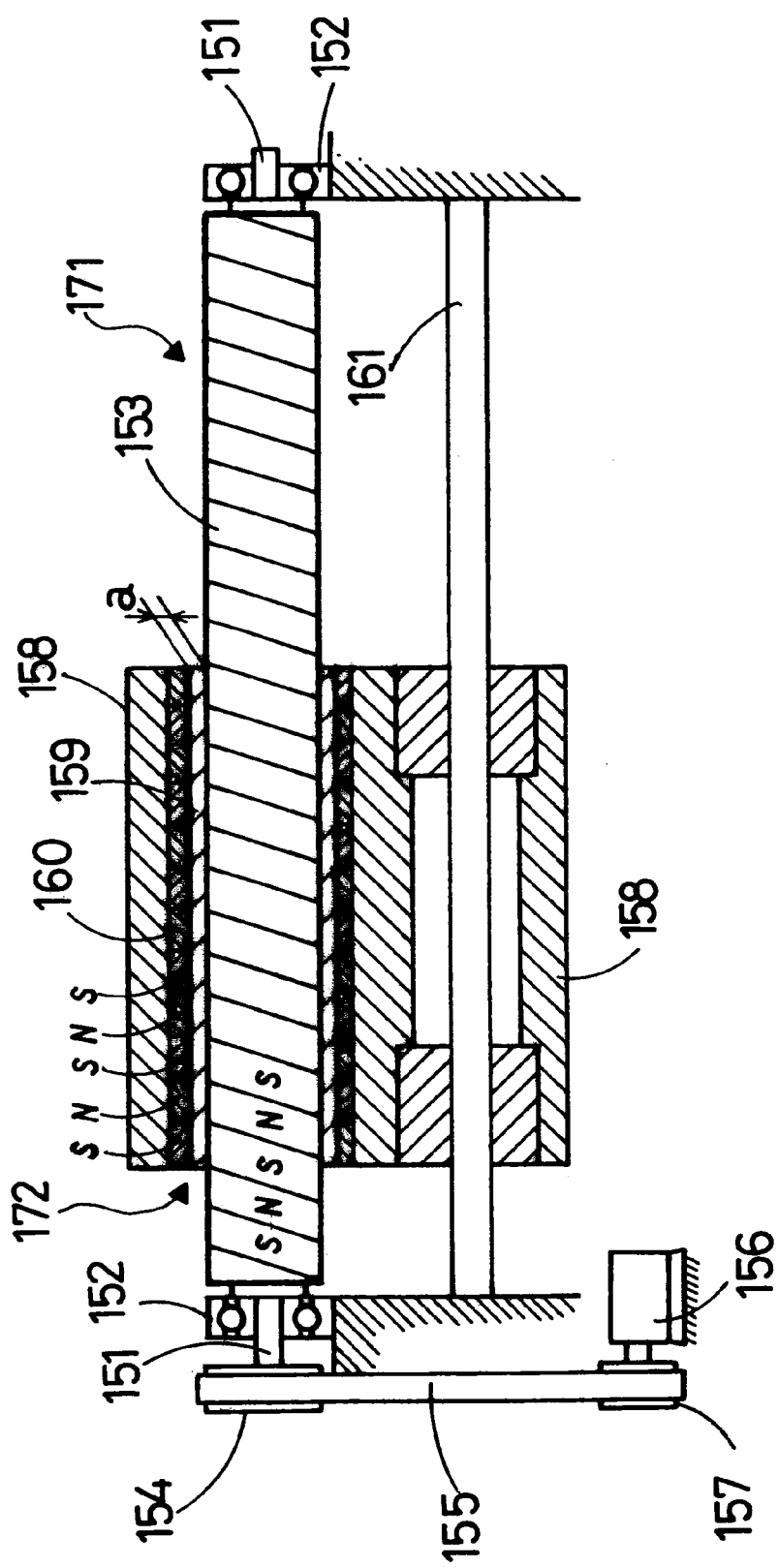
FIG. 19 is a sectional view of a magnetic screw conveying device in prior art.
Figure 20:
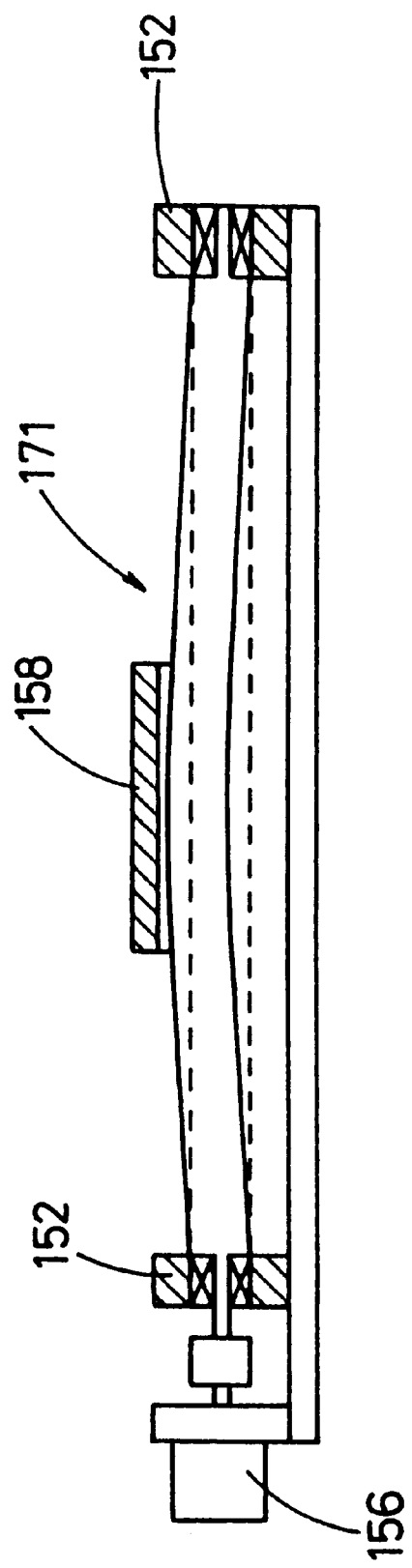
FIG. 20 is a schematic view showing a bending state of a shaft of a magnetic screw conveying device in prior art.

Construction of the slide table 102 will be continued with reference to FIG. 18 showing the front view of the magnetic screw conveying device in the present embodiment.

The slide table 102 is made of a plate having a predetermined thickness with a semi-cylindrical groove 102a formed at a center of the lower surface of the plate along the axis of the driving shaft 101. On the groove 102a is provided a spiral magnet 102b, thereby constructing a female magnetic screw 118. The spiral cylindrical magnet 102b has substantially the same construction as the cylindrical magnets 106b, 107b, 108b of the male magnetic screws 106, 107, 108, except to have a slightly larger diameter than those of the cylindrical magnets 106b, 107b, 108b. As shown in FIG. 17, a plurality of magnetized bands 117 forming the spiral magnet 102b are spirally provided on the surface of the groove 102a, these magnetized bands 117 being magnetized so that contiguous magnetized bands have opposite polarities.

On the lower surface of the slide table 102, as shown in FIG. 18, two sliders 119, 119 are arranged in parallel to the groove 102a at its both sides. The slide table 102 is mounted on the base 109 by engaging the sliders 119, 119 with two slide rails 120, 120 fixedly formed on the base 109, and thus the slide table 102 is prevented from rotating around the driving shaft 101.

Function of the magnetic screw conveying device constructed as above will be explained. Before operating the magnetic screw conveying device, it is necessary to adjust pitches between the male magnetic screws 106, 107, 108.

Conventionally, when a male magnetic screw is separated as the male magnetic screws 106, 107, 108 in the present embodiment, it was difficult to adjust pitches of the separate male magnetic screws so that a female magnetic screw can move smoothly even in separated portions. This has actually delayed putting male magnetic screws of separate type to practical use.

In the magnetic screw conveying device of the third embodiment, after all of screws 114 threadedly secured in the screw holes 115 are loosened, the slide table 102 is slid on the male magnetic screw 106 by hand manipulation. With the sliding of the slide table 102, the magnetized bands 117 of the female magnetic screw 118 works on the magnetized bands 116 of the male magnetic screw 106, thus rotating the male magnetic screw 106. At a rotational position, the male magnetic screw 106 is locked to the shafts 103 and 104 respectively with screws 114.

In a similar way, while the male magnetic screw 107 is put in a free state in the direction of rotation with respect to the middle support shaft 104, 104, the slide table 102 is slid forward and backward in an axis direction relative to the male magnetic screw 107. By the magnetic force between the spiral magnet 102b of the slide table 102 and the spiral cylindrical magnet 107b of the driving shaft 101, the male magnetic screw 107 rotates. At a position where the slide table 102 is positioned just above the male magnetic screw 107, this male magnetic screw 107 is also fastened both ends to the middle support shafts 104, 104 with screws 114. The same goes for the male magnetic screw 108.

These male magnetic screws 106, 107, and 108 are fixed in a position corresponding to the female magnetic screw 118 sliding above the male magnetic screws 106–108. Consequently, pitches of spirally magnetized bands 116 can be adjusted as if separated portions thereof divided with the middle support stands 111 continue.

When the male magnetic screws 106–108 are positioned in this way, the magnetic screw conveying device operates as below.

At first, when the motor 113 is at rest, not rotating the driving shaft 101, the magnetic force between the spiral cylindrical magnets 106b–108b of the male magnetic screws 106–108 and the spiral magnet 102b of the slide table 102 holds the driving shaft 101 in an arbitrary position where the magnetized bands 116 and 117 having polarities attracting each other face each other.

After that, when the motor 113 is rotated, its rotation is transmitted via the motor side support shaft 103 to the male magnetic screws 106–108 and the middle support shaft 104 and the end support shaft 105, which are fixedly connected as one unit. Along with the rotation of these male magnetic screws 106–108, their magnetized bands 116 rotate as if spirally advancing. In response to this spiral motion of the magnetized bands 116, the spiral magnets 102b of the slide table 102 tries to follow. At this time, the sliders 119, 119 are not especially affected by any force in the axis direction, thus being neutral. With the rotation of the driving shaft 101, therefore, the slide table 102 being prevented from rotating slides along the slide rails 120, 120.

The magnetic screw conveying device of the third embodiment, constructed as above, has the following effects. The male magnetic screws 106–108 are separate and the middle support stands 111, 111 are disposed at each separate portions between the contiguous male magnetic screws so that the driving shaft 101 can be maintained horizontally without bending even if it has a long length. As a result, in the case of the magnetic screw conveying device being long, the male magnetic screws 106–108 do not contact with the female magnetic screw 118 even if a distance (clearance) between both male and female magnetic screws is extremely small, the slide tale can smoothly slide.

The male magnetic screws can be fixed with screws 114 and, alternatively, allowed to rotate by loosening the screws 114, so that, even if the male magnetic screws are separately disposed, the magnetized bands 116 forming the male magnetic screws 106 108 can easily be adjusted so as to continue pitches of contiguous magnetic screws.

Since the driving shaft 101 is prevented from bending, furthermore, it is possible to reduce a distance between the male magnetic screws 106–108 and the female magnetic screw 118. At this time, the magnetic attracting force increases in reverse proportion to the square of the distance between the polarities of the male and female magnetic screws, and this is expressed by the following equation:

$$F=(1/2)U^* \mu S/1^2$$

where U is magnetomotive force, $\mu$ is permeability, 1 is the distance between the male and female magnetic screws, and S is the area of magnets facing.

Accordingly, if the distance is set to a half, for example, the attracting force will be four times, so that even after taking off that the area of the male and female magnets attracting each other is half due to the female magnetic screw 118 being semi-cylindrical as compared with a female magnetic screw being fully cylindrical, it is possible to provide twice as large attracting force as conventional magnetic screws. This makes it possible to control the magnetic screw conveying device with higher precision.

While the invention has been particularly shown and described with reference to preferred embodiments thereof, it will be understood by those skilled in the art that the foregoing and other changes in form and details can be made therein without departing from the spirit and scope of the invention.

For instance, although the slide bearing is provided on the supporting parts holding the shaft body in the first embodiment, instead thereof, a magnetic fluid bearing may be used. Two pairs of secondary holes 32 and secondary rods may be provided in parallel to each other, then enabling to support the housing more stably. It is further possible to drive the shaft body to rotate by hand manipulation with a machine handle, instead of a motor.

In the second embodiment, short hollow cylindrical magnets 83 and cylindrical magnets 75 are used, but the same effect can be obtained even if a long magnet material is used. The core pipe 82 and the rod member 68 in the second embodiment are separate members in order to reduce the manufacturing cost, these core pipe and rod member may be formed integratedly. In the second embodiment, stainless steel pipes being feeble magnetic metallic pipes are used for protecting tubes. Alternatively, copper or brass pipes being non-magnetic metallic pipe may be used.

Although the driving shaft 101 in the third embodiment is constructed of three separate parts, that is, male magnetic screws 106, 107, and 108, more separate parts may be used to form a longer driving shaft 101. As the support shaft to support those separate male magnetic screws, the motor side support shaft 103, the middle support shaft 104, 104, and the end support shaft 105 are used as separated, and those support shafts may be substituted by one continuous support shaft. Even if using such a continuous support shaft, it will not be bent, causing no problem.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A magnetic screw device comprising a male magnetic screw on an outside surface of which are provided magnetized bands with north polarity N and south polarity S arranged alternately in a spiral form, a female magnetic screw on a cylindrical inside surface facing the male magnetic screw, the cylindrical inside surface provided with magnetized bands with north polarity N and south polarity S arranged alternately in a spiral form, wherein said male magnetic screw comprises a rod member and a plurality of short cylindrical male magnetic screw members made of magnetic material being fitted continuously on the outer periphery of the rod member in its axis direction.

2. A magnetic screw device according to claim 1, wherein positioning means are provided between an inner surface of said male magnetic screw and said rod member.

3. A magnetic screw device according to claim 2, wherein said positioning means comprises a boss formed on either an inner surface of the male magnetic screw or the rod member and a boss groove formed on the other.

4. A magnetic screw device according to claim 1, wherein said male magnetic screw members are provided with a positioning projection at an end surface and a positioning groove at another end surface.

5. A magnetic screw device according to claim 1, wherein said rod member is formed of a high-permeability material.

6. A magnetic screw device according to claim 1, wherein for each male magnetic screw member the magnetized bands at both end portions that correspond in an axial direction are polarized in the same polarity.

7. A magnetic screw according to claim 1, wherein said male magnetic screw includes a protection tube to cover the outer periphery of the male magnetic screw.

8. A magnetic screw device according to claim 1, wherein said female magnetic screw member is provided with a positioning projection at an end portion and a positioning groove at another end portion.

9. A magnetic screw device according to claim 1, wherein said jacket member is formed of a high-permeability material.

10. A magnetic screw comprising a male magnetic screw on an outside surface of which are provided magnetized bands with north polarity N and south polarity S arranged alternately in a spiral form, a female magnetic screw on a cylindrical inside surface facing the male magnetic screw, the cylindrical inside surface provided with magnetized bands with a north polarity N and a south polarity S arranged alternately in a spiral form, wherein said female magnetic screw comprises a jacket member and a plurality of short cylindrical female magnetic screw members made of magnetic material being fitted continuously on the inner periphery of the jacket member in its axis direction.

11. A magnetic screw device according to claim 10, wherein positioning means are provided between an inner surface of said female magnetic screw and said jacket member.

12. A magnetic screw device according to claim 11, wherein said positioning means comprises a boss formed on either an inner surface of the female magnetic screw or the jacket member and a boss groove formed on the other.

13. A magnetic screw conveying device comprising a male magnetic screw having magnetized bands on its outer surface and a female magnetic screw having magnetized bands on its inner surface, wherein said male magnetic screw includes a protection tube to cover the outer periohery of the male magnetic screw, and said protection tube is a thermal contractible tube.

14. A magnetic screw conveying device comprising a male magnetic screw having magnetized bands on its outer surface and a female magnetic screw having magnetized bands on its inner surface, wherein said male magnetic screw includes a first protection tube which contacts the outer surface of the male magnetic screw to cover the outer periphery of the male magnetic screw.

15. A magnetic screw conveying device according to claim 14, wherein said first protection tube comprises a feeble magnetic or non-magnetic metallic pipe.

16. A magnetic screw conveying device according to claim 15, wherein said feeble magnetic pipe is a stainless steel pipe.

17. A magnetic screw conveying device according to claim 15, wherein said non-magnetic metallic pipe is a copper or brass pipe.

18. A magnetic screw conveying device according to claim 14, wherein said female magnetic screw includes a second protection tube to cover an inner periphery of the female magnetic screw.

19. A magnetic screw conveying device according to claim 18, wherein said second protection tube comprises a feeble magnetic or non-magnetic metallic pipe.

20. A magnetic screw conveying device according to claim 19, wherein said feeble magnetic pipe is a stainless steel pipe.

21. A magnetic screw conveying device according to claim 19, wherein said non-magnetic metallic pipe is a copper or brass pipe.

22. A magnetic screw conveying device comprising a driving shaft including a male magnetic screw having magnetized bands with north polarity N and south polarity S arranged alternately and spirally on an outside surface on an outer periphery of a rod member, and a driving member including a female magnetic screw having magnetized bands with south polarity S and north polarity N arranged alternately and spirally on an inside surface facing the male magnetic screw, magnetic force working between the male and the female magnetic screws converting rotary motion of the driving shaft into linear motion of the driving member, wherein said male magnetic screw is constructed from a plurality of separate magnetic screws, and the magnetic screw conveying device further comprises a support stand for supporting rotatably said rod member between the separate male magnetic screws.

23. A magnetic screw conveying device according to claim 22, wherein said plural separate male magnetic screws are rotatably mounted on said rod member.

24. A magnetic screw conveying device according to claim 23, further comprising a locking member for locking said male magnetic screws to said rod member at a predetermined rotational position.

25. A magnetic screw conveying device according to claim 24, wherein said locking member comprises a screw hole formed in the male magnetic screw along a vertical direction with respect to an axis of said rod member, and a screw threadedly fitted into the screw hole, for fixing the male magnetic screw to the rod member.

26. A magnetic screw conveying device according to claim 22, wherein said driving member is provided with a semi-cylindrical groove to cover an upper half of the male magnetic screw, and said female magnetic screw is disposed on the semi-cylindrical groove so as to correspond with a form of the groove.

* * * * *